(12) United States Patent
Nakagawa et al.

(10) Patent No.: US 12,034,829 B2
(45) Date of Patent: Jul. 9, 2024

(54) TRANSMISSION DEVICE, RECEPTION DEVICE, AND BASE STATION

(71) Applicant: Mitsubishi Electric Corporation, Tokyo (JP)

(72) Inventors: Kenji Nakagawa, Tokyo (JP); Koji Tomitsuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 18/155,809

(22) Filed: Jan. 18, 2023

(65) Prior Publication Data

US 2023/0155808 A1 May 18, 2023

Related U.S. Application Data

(63) Continuation of application No. PCT/JP2020/033218, filed on Sep. 2, 2020.

(51) Int. Cl.
*H04L 7/033* (2006.01)
*H04L 7/04* (2006.01)

(52) U.S. Cl.
CPC .............. *H04L 7/033* (2013.01); *H04L 7/041* (2013.01)

(58) Field of Classification Search
None
See application file for complete search history.

(56) References Cited

U.S. PATENT DOCUMENTS 9,054,926 B1 * 6/2015 Dattatreya .......... H04L 27/2331
2014/0348096 A1 11/2014 Nagata et al.

FOREIGN PATENT DOCUMENTS

| EP | 1835679 A2 * | 9/2007 | ............. H04B 1/707 |
| JP | 2013-110671 A | 6/2013 | |
| JP | 6685485 B1 * | 4/2020 | |
| WO | WO-2008041940 A2 * | 4/2008 | ............. H04B 1/713 |

OTHER PUBLICATIONS

International Search Report for PCT/JP2020/033218(PCT/ISA/210) mailed on Nov. 24, 2020.

(Continued)

*Primary Examiner* — Kevin Kim
(74) *Attorney, Agent, or Firm* — Birch, Stewart, Kolasch & Birch, LLP

(57) ABSTRACT

A transmission device included in one base station in a radio communication system including communication areas adjacent to each other in which the base station communicates with a plurality of wireless terminals includes: a modulation unit that generates a data symbol sequence; a synchronization signal generating unit that generates a first symbol sequence constituted by two or more continuous repetitions of reference sequence symbols being a reference, generates a second symbol sequence by performing frequency shifting on the first symbol sequence by using a phase rotation sequence so that the reference sequence symbols become orthogonal for each of the wireless terminals, and generates a synchronization signal; and a synchronization signal adding unit that generates a transmission signal by adding the synchronization signal to the data symbol sequence.

16 Claims, 19 Drawing Sheets

(56) References Cited

OTHER PUBLICATIONS

Panasonic; NTT DoCoMo, "Narrow band uplink reference signal sequences and allocation for E-UTRA", 3GPP TSG-RAN WG1 Meeting #47, R1-063183, Riga, Latvia, Nov. 6-10, 2006.
Written Opinion of the International Searching Authority for PCT/JP2020/033218(PCT/ISA/237) mailed on Nov. 24, 2020.
Indian Office Action dated Aug. 3, 2023 for Application No. 202347009982 with an English translation.

* cited by examiner

TRANSMISSION DEVICE, RECEPTION DEVICE, AND BASE STATION

CROSS-REFERENCE TO RELATED APPLICATION

This application is a continuation application of International Application PCT/JP2020/033218, filed on Sep. 2, 2020, and designating the U.S., the entire contents of which are incorporated herein by reference.

BACKGROUND OF THE INVENTION

1. Field of the Invention

The present disclosure relates to a transmission device, a reception device, and a base station.

2. Description of the Related Art

In related art, for performing a synchronization process using a preamble included in a received signal, that is, the auto-correlation property of a synchronization signal by a reception device, there is a method for increasing the symbol length of the synchronization signal to increase the auto-correlation property as a method of improving the synchronization performance. In a case where one ground station accommodates a plurality of terminals, the ground station needs to make synchronization signals orthogonal among the terminals to reduce cross-correlation between terminals. An example of a sequence with a high auto-correlation property is a Zadoff-Chu (ZC) sequence. In a case where individual terminals independently and randomly transmit signals and share one channel like a random access channel (RACH) in an uplink access method, ZC sequences having a high auto-correlation property may be used as a pilot signal for channel estimation.

In addition, Non Patent Literature 1, "Panasonic, NTT DoCoMo "Narrow band uplink reference signal sequences and allocation for E-UTRA", 3GPP TSG-RAN WG1 Meeting #47, R1-063183, Riga, Latvia, Nov. 6-10, 2006 teaches a technology of using, as uplink pilot signals, cyclic-shift Zadoff-Chu (ZC) sequences obtained by cyclic shifting of ZC sequences in order to reduce inter-cell interference mutually received by pilot signals among cells in frame timing synchronization with each other in a multi-cell system. In this manner, Non Patent Literature 1, "Panasonic, NTT DoCoMo "Narrow band uplink reference signal sequences and allocation for E-UTRA", 3GPP TSG-RAN WG1 Meeting #47, R1-063183, Riga, Latvia, Nov. 6-10, 2006 makes synchronization signals, which are assigned to respective terminals or a plurality of cells, orthogonal to each other, reduces interference of synchronization signals, and achieves multiplexing of terminals.

With the technology of the related art, however, when cyclic-shift ZC sequences are used for synchronization signals, a sidelobe due to cross-correlation between terminals is caused by performing cyclic shifting. There is therefore a problem in that estimation error may occur at the terminals. In addition, according to the technology of the related art, because the orthogonality is maintained by using all the symbols of a cyclic-shift ZC sequence, the orthogonality among terminals is lost when channel variation occurs within the symbols of the cyclic-shift ZC sequence. In a case where the number of symbols of the cyclic-shift ZC sequence to be used is reduced as measures against channel variation, there is a problem in that thermal noise tolerance and interference signal tolerance attributable to signal averaging are lowered.

The present disclosure has been made in view of the above, and an object thereof is to provide a transmission device capable of improving synchronization performance in an environment in which the states of channels vary in a radio communication system including a plurality of communication areas.

SUMMARY OF THE INVENTION

In order to solve the above problem and achieve the object, the present disclosure is included in one base station in a radio communication system including communication areas adjacent to each other in which the base station communicates with a plurality of wireless terminals. The present disclosure includes: a modulation unit to generate a data symbol sequence; a synchronization signal generating unit to generate a first symbol sequence constituted by two or more continuous repetitions of reference sequence symbols being a reference, generate a second symbol sequence by performing frequency shifting on the first symbol sequence by using a phase rotation sequence so that the reference sequence symbols become orthogonal for each of the wireless terminals, and generate a synchronization signal; and a synchronization signal adding unit to generate a transmission signal by adding the synchronization signal to the data symbol sequence.

DETAILED DESCRIPTION OF THE PREFERRED EMBODIMENTS

A transmission device, a reception device, a base station, a wireless terminal, a radio communication system, a control circuit, a storage medium, a transmission method, and a reception method according to certain embodiments of the present disclosure will be described in detail below with reference to the drawings.

First Embodiment

Figure 1:
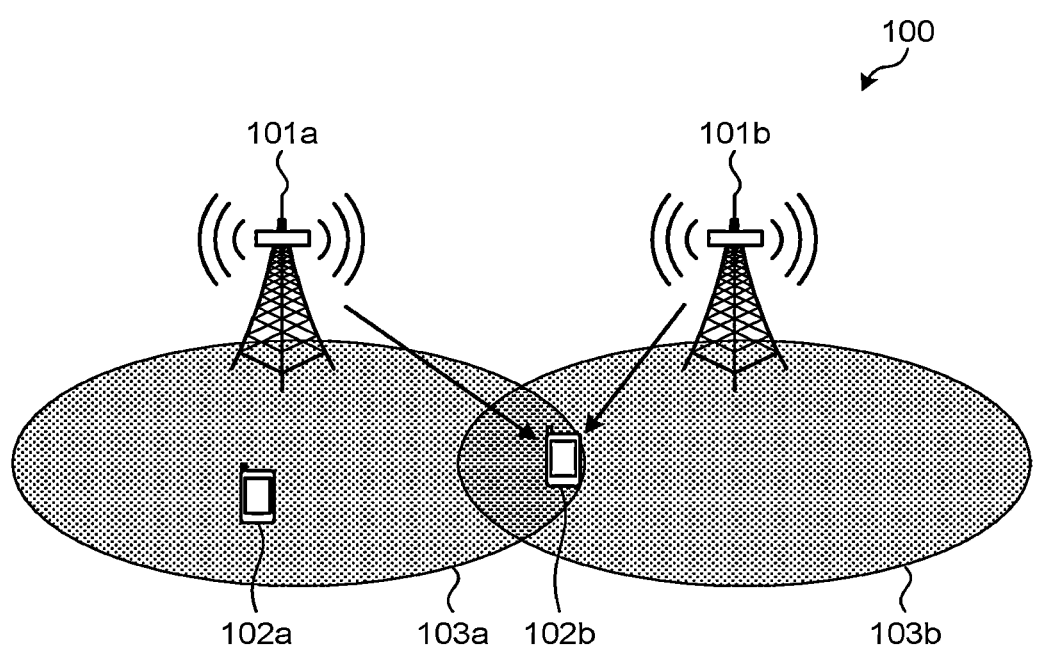
FIG. 1 is a diagram illustrating an example of a configuration of a radio communication system according to a first embodiment.

FIG. 1 is a diagram illustrating an example of a configuration of a radio communication system 100 according to a first embodiment. The radio communication system 100 includes base stations 101a and 101b, and wireless terminals 102a and 102b. The base station 101a forms a communication area 103a. The base station 101b forms a communication area 103b. In the description below, the base stations 101a and 101b may be referred to as base stations 101 when the base stations are not distinguished from one another, the wireless terminals 102a and 102b may be referred to as wireless terminals 102 when the wireless terminals are not distinguished from one another, and the communication areas 103a and 103b may be referred to as communication areas 103 when the communication areas are not distinguished from one another. The radio communication system 100 is a system in which a plurality of communication areas 103 are formed, which are adjacent to each other.

In the radio communication system 100, one base station 101 forms one communication area 103, and the communication area 103 can accommodate a plurality of wireless terminals 102. Specifically, a base station 101 transmits a signal for each wireless terminal 102. Each wireless terminal 102 receives the signal transmitted from the base station 101 and performs communication in the communication area 103. The number of wireless terminals 102 accommodated in the communication area 103 is one or more, and is not limited. Note that other base stations 101 may be accommodated in the communication area 103 of the base station 101, and the number of base stations 101 accommodated in each communication area 103 is not limited. In the radio communication system 100, all the base stations 101 are each assumed to be in time synchronization with the other base stations 101, and transmit signals, that is, radio frames at the same timings. As the method of time synchronization between the base stations 101, any method may be used. All the base stations 101 implement time synchronization by using a global positioning system (GPS), for example. Two or more first base stations located at a boundary of communication areas 103 adjacent to each other transmit radio frames including different synchronization signals from each other. The synchronization signals included in the radio frames transmitted by the first base stations are also different from synchronization signals included in radio frames transmitted by second base stations that are not located at the boundary of the communication areas 103.

A base station 101 includes a transmission device and a reception device. A wireless terminal 102 also includes a transmission device and a reception device. In the present embodiment, configurations and operations of a transmission device included in a base station 101 and a reception device included in a wireless terminal 102 will be described.

Figure 2:
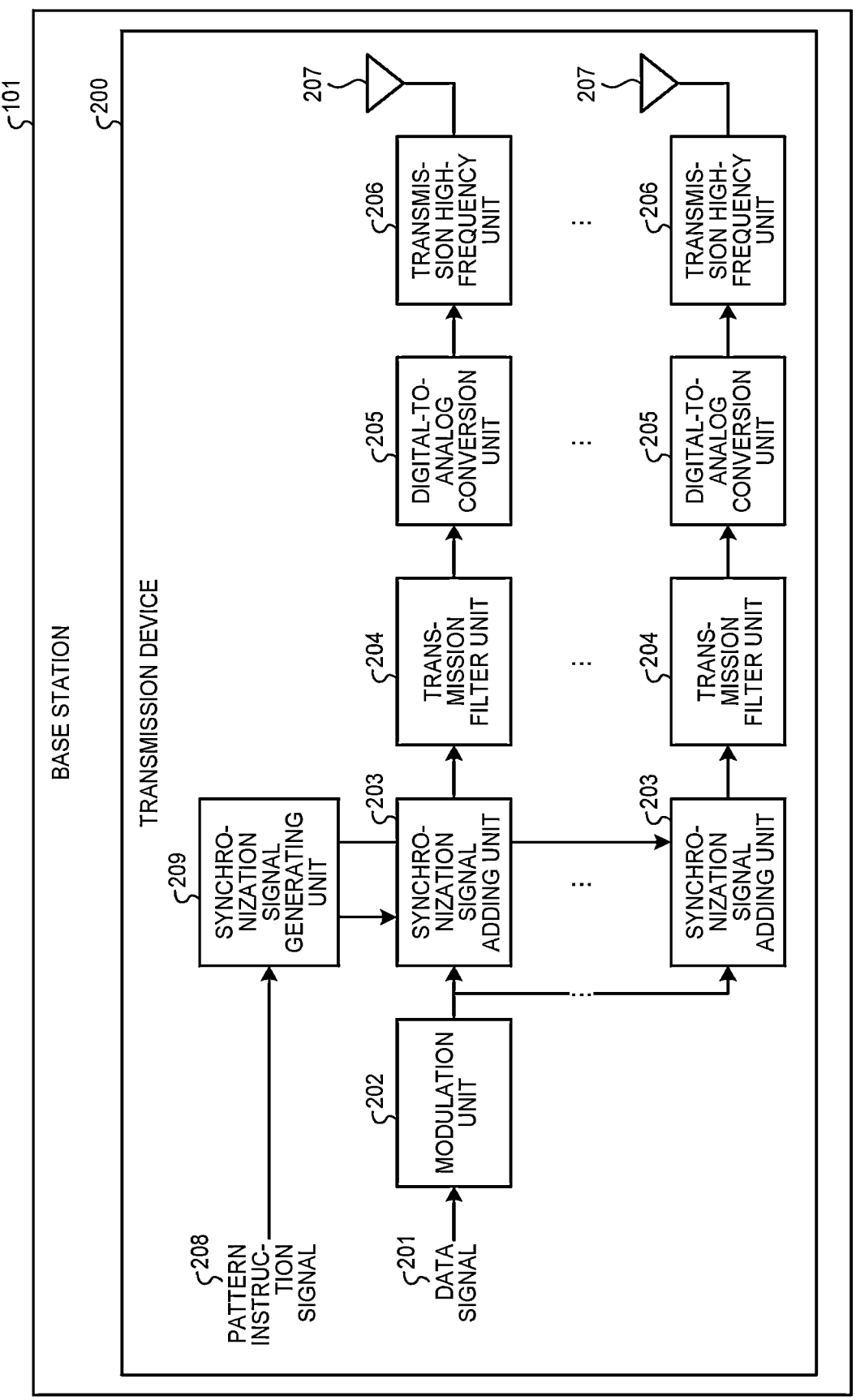
FIG. 2 is a diagram illustrating an example of a configuration of a transmission device included in a base station according to the first embodiment.

First, a transmission device included in a base station 101 will be described. FIG. 2 is a diagram illustrating an example of a configuration of a transmission device 200 included in a base station 101 according to the first embodiment. The transmission device 200 includes a modulation unit 202, a synchronization signal generating unit 209, synchronization signal adding units 203, transmission filter units 204, digital-to-analog conversion units 205, transmission high-frequency units 206, and transmission antennas 207. In the example illustrated in FIG. 2, the transmission device 200 includes a plurality of sets including a synchronization signal adding unit 203, a transmission filter unit 204, a digital-to-analog conversion unit 205, a transmission high-frequency unit 206, and a transmission antenna 207. Note that the transmission device 200 may have a configuration including only one set including a synchronization signal adding unit 203, a transmission filter unit 204, a digital-to-analog conversion unit 205, a transmission high-frequency unit 206, and a transmission antenna 207.

The modulation unit 202 performs first-order modulation on a data signal 201, which is a bit sequence, to generate a data symbol sequence. Examples of the modulation method of the first-order modulation include phase shift keying (PSK), frequency shift keying (FSK), and quadrature amplitude modulation (QAM), but are not limited thereto. The modulation unit 202 outputs the generated data symbol sequence to each of the synchronization signal adding units 203.

The synchronization signal generating unit 209 generates a synchronization signal on the basis of a pattern instruction signal 208 input as a control parameter to the transmission device 200. Specifically, the synchronization signal generating unit 209 generates, as the synchronization signal, a symbol sequence in which an arrangement pattern of transmission symbols on a frequency axis is a frequency pattern instructed by the pattern instruction signal 208. The synchronization signal generating unit 209 outputs the generated symbol sequence, that is, the synchronization signal to each of the synchronization signal adding units 203. In the present embodiment, pattern instruction signals 208 indicate frequency patterns to the respective transmission devices 200 included in the radio communication system 100 so that the transmission devices 200 transmit symbol signals, that is, synchronization signals whose frequency patterns are different from each other. Regarding the pattern instruction signals 208 for the respective transmission devices 200 in the radio communication system 100, a host device or host devices of base stations 101 including the transmission devices 200 output, to the respective base stations 101, the pattern instruction signals 208 depending on the respective base stations 101, for example. Detailed configuration and operation of the synchronization signal generating unit 209 will be described later.

Each synchronization signal adding unit 203 generates a transmission signal on the basis of the synchronization signal generated by the synchronization signal generating unit 209 and the data symbol sequence generated by the modulation unit 202. Specifically, the synchronization signal adding unit 203 generates a transmission signal by adding the synchronization signal obtained from the synchronization signal generating unit 209 in units of radio frames to the data symbol sequence obtained from the modulation unit 202. The synchronization signal adding unit 203 outputs the generated transmission signal to the transmission filter unit 204.

Each transmission filter unit 204 upsamples the transmission signal obtained from the synchronization signal adding unit 203 and limits the bandwidth to generate a baseband signal or a transmission digital signal, which is an intermediate frequency (IF) signal. A Nyquist filter is typically used as a bandlimiting filter used by the transmission filter unit 204 when limiting the bandwidth of a transmission signal, but the bandlimiting filter is not limited thereto. The transmission filter unit 204 outputs the generated transmission digital signal to the digital-to-analog conversion unit 205.

Each digital-to-analog conversion unit 205 converts the transmission digital signal obtained from the transmission filter unit 204 into a transmission analog signal. The digital-to-analog conversion unit 205 outputs the transmission analog signal resulting from the conversion to the transmission high-frequency unit 206. Each transmission high-frequency unit 206 performs frequency conversion on the transmission analog signal obtained from the digital-to-analog conversion unit 205 to generate a radio frame, which is a signal in a radio frequency band. Each transmission high-frequency unit 206 outputs the radio frame to the transmission antenna 207. Each transmission antenna 207 radiates the radio frame obtained from the transmission high-frequency unit 206 in a form of a radio wave.

The transmission device 200 has a configuration capable of transmitting not only the same synchronization signals as the synchronization signals included in radio frames transmitted from the respective transmission antennas 207, but also synchronization signals different from the synchronization signals included in the radio frames transmitted from the respective transmission antennas 207, in accordance with the pattern instruction signals 208. Alternatively, a transmission device 200 according to a modification may have a configuration in which the synchronization signal adding unit 203 is connected downstream of the transmission filter unit 204, and a synchronization signal is added to a transmission digital signal resulting from band limitation by the transmission filter unit 204. In this case, the synchronization signal generating unit 209 generates a synchronization signal with the same sampling rate as that of the transmission digital signal output from the transmission filter unit 204.

Figure 3:
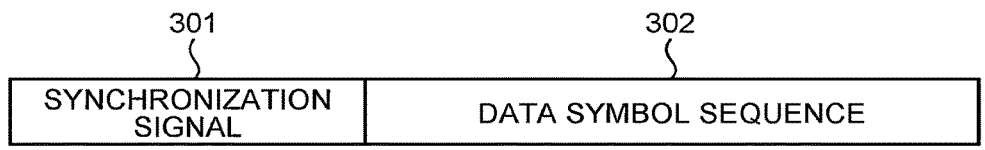
FIG. 3 is a diagram illustrating an example of a structure of a radio frame transmitted by a transmission device of a base station according to the first embodiment.

FIG. 3 is a diagram illustrating an example of a structure of a radio frame transmitted by the transmission device 200 of the base station 101 according to the first embodiment. As illustrated in FIG. 3, a radio frame has a structure in which a synchronization signal 301 is added to a data symbol sequence 302 in units of radio frame. As described above, the synchronization signal 301 is generated by the synchronization signal generating unit 209, and the data symbol sequence 302 is generated by the modulation unit 202.

The synchronization signal 301 is used for synchronization of radio frames, frequency synchronization, symbol timing synchronization, and the like by a wireless terminal 102 of the reception side. The synchronization signal 301 is a signal with a frequency pattern varying depending on time in units of reference sequence symbols. In addition, the shape of the frequency pattern of the synchronization signal 301 varies depending on the communication area 103 formed by a base station 101 and varies depending on the wireless terminal 102 with which the transmission device 200 communicates. Details thereof will be described later. When the frequency pattern of the synchronization signal 301 varies depending on each base station 101, each wireless terminal 102 can individually measure, for each base station 101, the reception electric field intensity of a radio frame transmitted from each base station 101.

Figure 4:
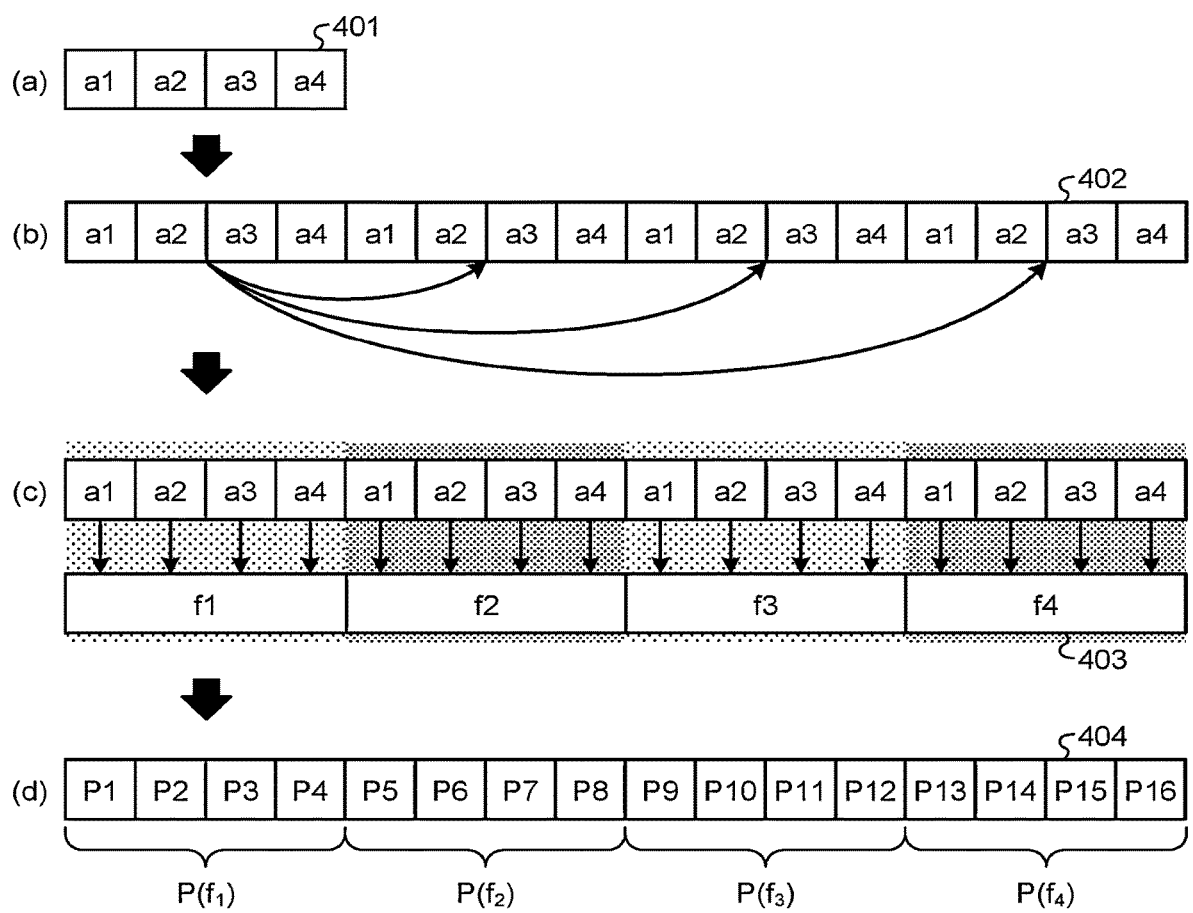
FIG. 4 is a diagram illustrating procedures of generating a frequency shift pattern signal as a synchronization signal by a synchronization signal generating unit of a transmission device according to the first embodiment.

A signal with a frequency shift pattern generated by the synchronization signal generating unit 209 (hereinafter referred to as a frequency shift pattern signal) will be described. FIG. 4 is a diagram illustrating procedures of generating a frequency shift pattern signal as a synchronization signal by the synchronization signal generating unit 209 of a transmission device 200 according to the first embodiment. The synchronization signal generating unit 209 first generates a first symbol sequence 402 obtained by repeating reference sequence symbols 401 and connecting the resulting reference sequence symbols 401 as illustrated in FIGS. 4(a) and 4(b). The reference sequence symbols 401 constitute a symbol sequence that is known by a wireless terminal 102 of the reception side, and are expressed by a complex vector having preset amplitude and phase. In the example of FIG. 4(b), the first symbol sequence 402 is a symbol sequence obtained by repeating the reference sequence symbols 401 four times.

In the example illustrated in FIG. 4, the reference sequence symbols 401 constitute a symbol sequence for synchronization including four symbols a1 to a4. Because the reference sequence symbols 401 are also used for synchronization of radio frames bye the wireless terminal 102 of the reception side, it is preferable to apply a combination of a plurality of orthogonal symbol sequences with good auto-correlation property and good cross-correlation property. A Walsh code or a constant amplitude zero auto-correlation (CAZAC) sequence, for example, may be applied to the reference sequence symbols 401. The synchronization signal generating unit 209 can increase the number of frequency shift pattern signals that are orthogonal to each other by using each of a plurality of orthogonal sequences as the reference sequence symbols 401.

Subsequently, as illustrated in FIG. 4(c), the synchronization signal generating unit 209 performs first frequency shifting of multiplying the first symbol sequence 402, which is obtained by repeating the reference sequence symbols 401 and connecting the resulting reference sequence symbols 401, by a frequency shift amount $f_{k,m}$ 403. The synchronization signal generating unit 209 can thus generate a second symbol sequence 404 illustrated in FIG. 4(d). The second symbol sequence 404 is a frequency shift pattern signal corresponding to the synchronization signal 301 illustrated in FIG. 3. When the first symbol sequence 402 obtained by repeating the reference sequence symbols 401 and connecting the resulting reference sequence symbols 401 is represented by $a_k$ and a symbol sequence constituting the frequency shift pattern signal is represented by $P_k$, the symbol sequence $P_k$ can be calculated by formula (1).

Formula 1:

$$P_k = a_k \exp[2\pi j f_{k,m} k] \quad (1)$$

In formula (1), $f_{k,m}$ represents a frequency shift amount that is the same value in each unit of the reference sequence symbols 401. When k represents an index number of the symbol sequence constituting the frequency shift pattern signal and N represents the sequence length of the frequency shift pattern signal, k is an integer satisfying $1 \leq k \leq N$. m represents a parameter determining The amount of frequency by which each set of reference sequence symbols 401 is to be shifted. m is a preset integer. Alternatively, as expressed by formula (2), the symbol sequence $P_k$ can also be obtained by performing different phase rotation on each symbol.

Formula 2:

$$P_k = a_k \exp[j\theta_{k,m}/L] \quad (2)$$

In formula (2), $\theta_{k,m}$ represents a phase rotation amount corresponding to frequency shifting, and L represents the number of reference sequence symbols indicating the number of symbols of the reference sequence symbols 401. Note that $0 < m \leq L$, is satisfied.

FIG. 4 illustrates an example of a case where the sequence length L, which is the number of reference sequence symbols 401, is L=4 and the number of repetitions REPM is REPM=4, and in this case, the sequence length of the frequency shift pattern signal is L×REPM=16. The synchronization signal generating unit 209 can generate the second symbol sequence 404, which is a frequency shift pattern signal, that is, a synchronization signal through the process as described above, but is not limited thereto. The synchronization signal generating unit 209 may be configured to store all frequency shift pattern signals generated in advance in a memory or the like, select a frequency shift pattern signal indicated by the pattern instruction signal 208 and read the frequency shift pattern signal as a synchronization signal from the memory.

Figure 5:
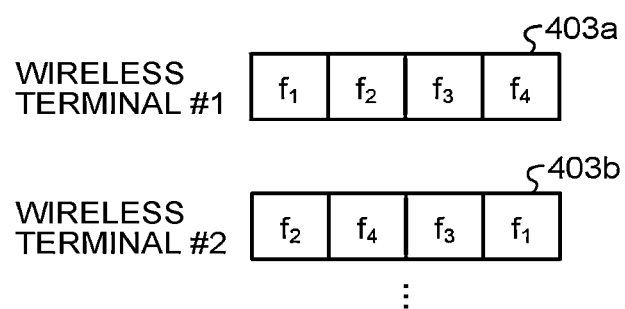
FIG. 5 is a diagram illustrating an example of frequency shifting in multiplexing of wireless terminals by a synchronization signal generating unit of a transmission device according to the first embodiment.

FIG. 5 is a diagram illustrating an example of frequency shifting in multiplexing of wireless terminals 102 by the synchronization signal generating unit 209 of the transmission device 200 according to the first embodiment. As illustrated in FIG. 5, the synchronization signal generating unit 209 can use the reference sequence symbols 401 in common as a symbol sequence for synchronization for a plurality of wireless terminals 102 by selecting frequency shift amounts $f_{k,m}$ 403a and 403b to be orthogonal between users, that is, between wireless terminals 102. While two wireless terminals 102, which are wireless terminals #1 and #2, are specifically illustrated as a plurality of wireless terminals 102 in the example illustrated in FIG. 5, the number of wireless terminals 102 may be three or more. In addition, the synchronization signal generating unit 209 can increase the number of synchronization signals, that is, the number of the generated second symbol sequences 404 by selecting the reference sequence symbols 401 for synchronization to be sequences orthogonal to each other and also the frequency shift amounts $f_{k,m}$ 403 to be sequences orthogonal to each other.

Figure 6:
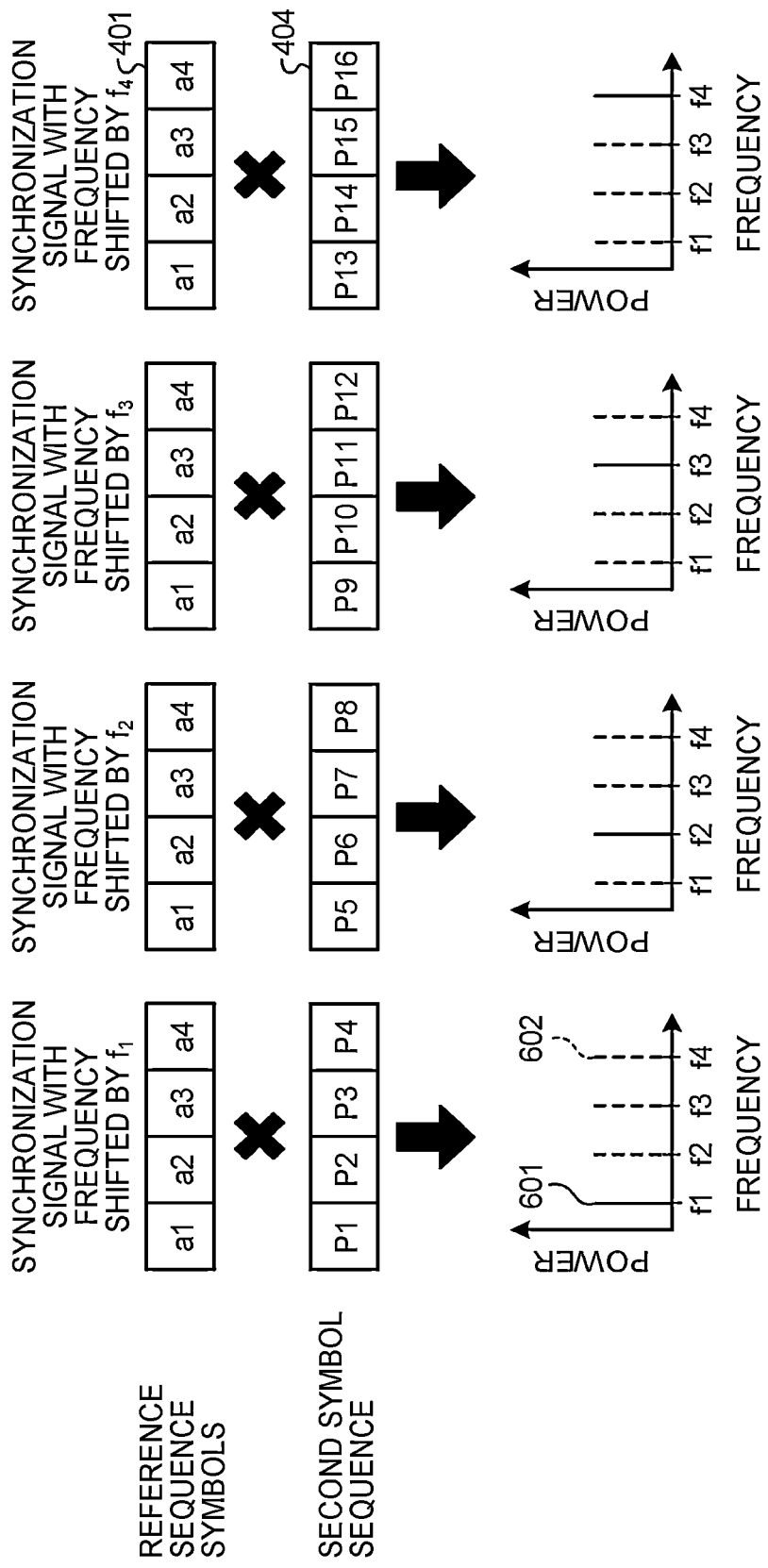
FIG. 6 is a diagram illustrating examples of a spectrum of an inner product of a second symbol sequence, which is a frequency shift pattern signal generated by a synchronization signal generating unit of a transmission device according to the first embodiment, in units of reference sequence symbols.
Figure 7:
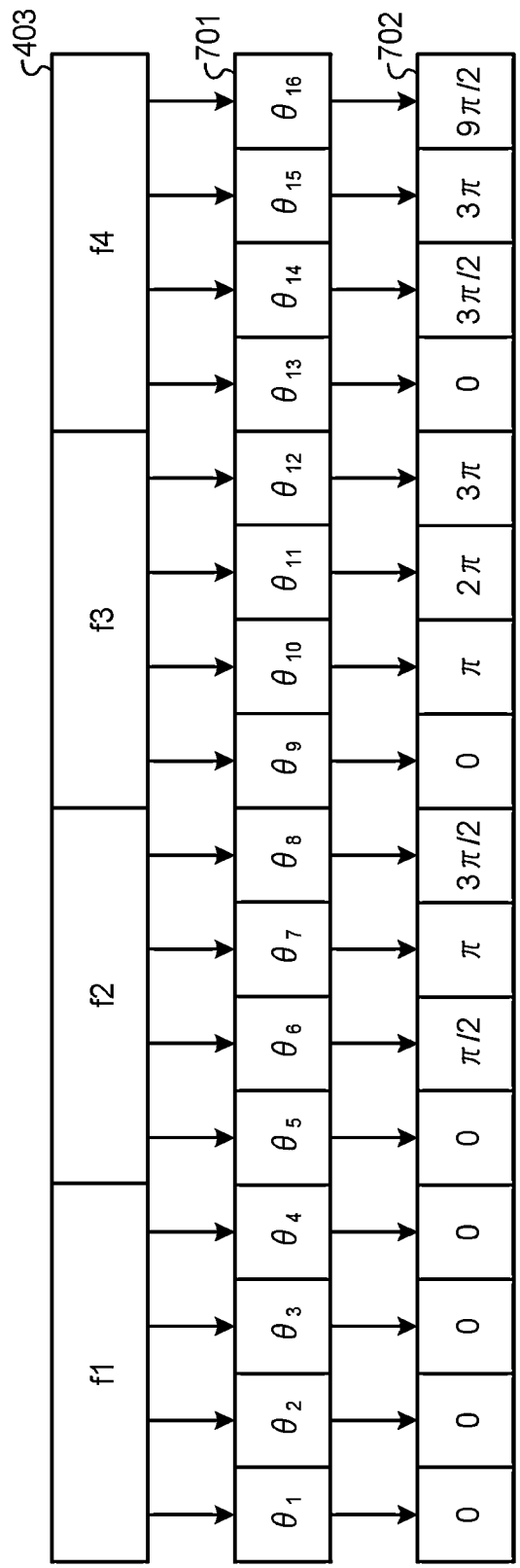
FIG. 7 is a diagram illustrating examples of a phase with which a frequency spectrum is generated by frequency shifting by a synchronization signal generating unit of a transmission device according to the first embodiment.

FIG. 6 is a diagram illustrating examples of a spectrum of an inner product of the second symbol sequence 404, which is a frequency shift pattern signal generated by the synchronization signal generating unit 209 of the transmission device 200 according to the first embodiment in units of the reference sequence symbols 401. FIG. 7 is a diagram illustrating examples of a phase with which the frequency spectrum is generated by frequency shifting by the synchronization signal generating unit 209 of the transmission device 200 according to the first embodiment. FIG. 6 illustrates examples in which the spectral position of the frequency spectrum is shifted by the frequency shift amount $f_{k,m}$ 403 of formula (1) illustrated in FIG. 7 or a phase rotation amount $\theta_{k,m}$ 701 of formula (2) illustrated in FIG. 7. In FIG. 7, 702 represents a specific example of the phase rotation amount $\theta_{k,m}$ 701.

In addition, in FIG. 6, a signal power at a frequency position at which a signal component is present is represented by 601, and a signal power at null frequency, that is, a frequency position at which no signal component is present is represented by 602. The synchronization signal generating unit 209 can distribute signal components of each frequency shift pattern signal to a specific frequency position and make the signal components orthogonal to each other in the frequency domain by changing a set of m which is a parameter. Thus, the synchronization signal generating unit 209 can generate m kinds of frequency shift pattern signals each with signal components distributed to a specific frequency position, where the frequency positions at which the signal components are present differ from each other. The number of frequency shift pattern signals that are orthogonal in the frequency domain depends on the number of repetitions of the basic reference sequence symbols 401 in the process of generating frequency shift pattern signals, that is, the number of repetitions REPM of the reference sequence symbols 401 for obtaining the first symbol sequence 402 illustrated in FIG. 4.

The radio communication system 100 uses a plurality of orthogonal frequency shift pattern signals obtained as described above to assign different frequency shift pattern signals as synchronization signals to the transmission devices 200 of the respective base stations 101 each forming a communication area 103. The assignment of the frequency shift pattern signals to the transmission devices 200 of the respective base stations 101 is performed by a host device or host devices of the base stations 101, for example. In a case where a transmission device 200 of a base station 101 includes a plurality of transmission antennas 207 as in the example of the configuration illustrated in FIG. 2, the radio communication system 100 may assign different frequency shift pattern signals as synchronization signals to the respective transmission antennas 207.

In addition, the radio communication system 100 assigns different frequency shift pattern signals as synchronization signals to transmission devices 200 of the respective base stations 101 of two adjacent communication areas 103, which are the base stations 101a and 101b of the two adjacent communication areas 103a and 103b in the example of FIG. 1. In this case, in the radio communication system 100, synchronization signals that are different frequency shift pattern signals are assigned to all the base stations 101 each forming a communication area 103, including a base station 101 at the boundary of the communication area 103a and the communication area 103b. In addition, as a result of selecting synchronization signals, which are frequency shift pattern signals, to be assigned to the respective wireless terminals 102 so that the synchronization signals are orthogonal for each wireless terminal 102 by the base station 101, the wireless terminals 102 can remove overreach interference from another communication area 103.

In addition to the method of using frequency shift pattern signals as synchronization signals, there is a method of repeating a frequency shift pattern signal as a method for improving the synchronization performance. Generally, as the number of symbols is used for a synchronization signal is larger, a sequence is more unique. Thus, the synchronization performance can be improved by increasing the sequence length; however, the maximum length of a frequency shift pattern signal is L×REPM.

Figure 8:
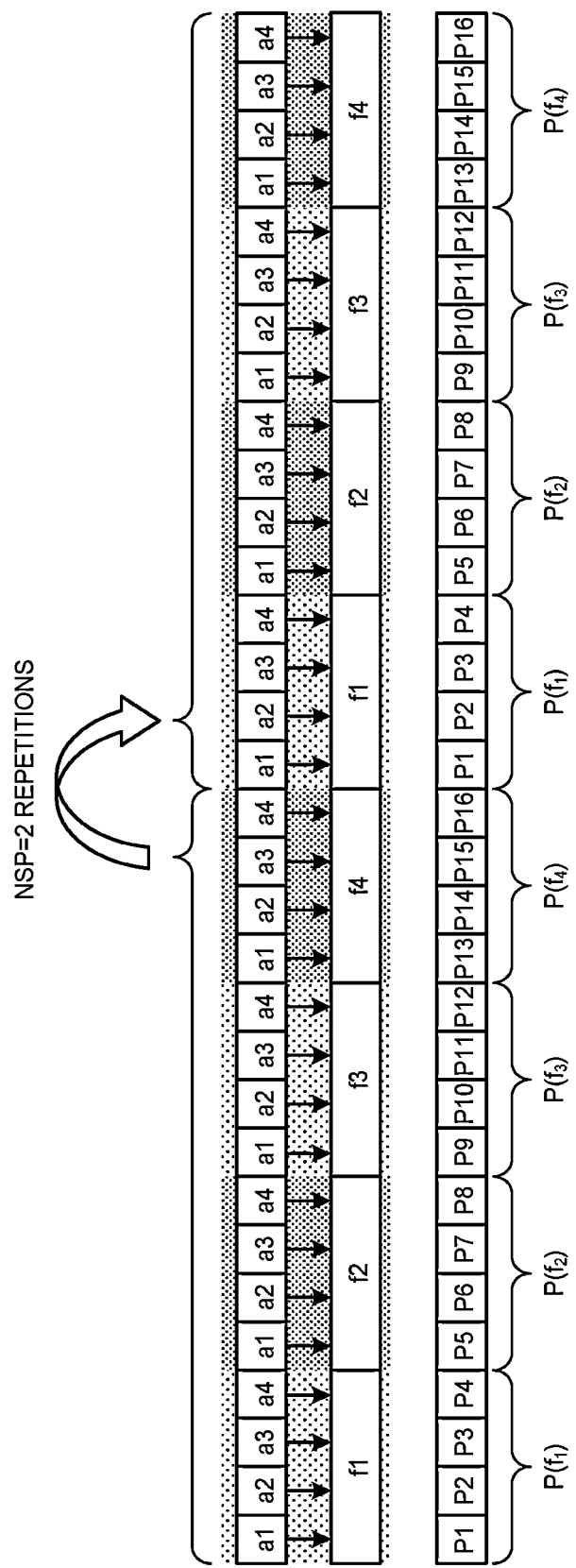
FIG. 8 is a diagram illustrating an example of a plurality of frequency shift pattern signals connected by a synchronization signal generating unit of a transmission device according to the first embodiment.
Figure 9:
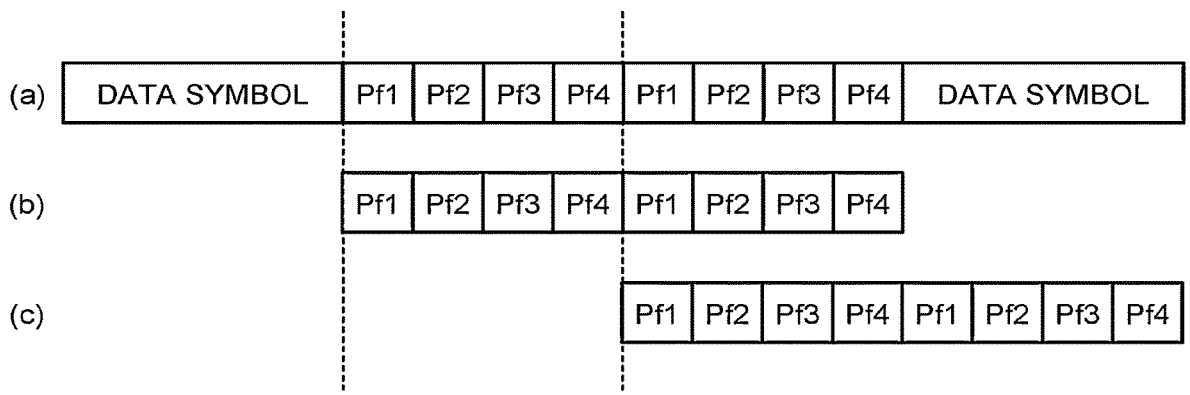
FIG. 9 is a diagram illustrating a reason for which cross-correlation occurs in a case where a synchronization signal generating unit of a transmission device according to the first embodiment connects a plurality of frequency shift pattern signals.

Thus, there is a method of simply repeating a frequency shift pattern signal in units of L×REPM symbols as illustrated in FIG. 8, but in this case, as illustrated in FIG. 9, the repetition of the sequence of the frequency shift pattern signal may cause a sidelobe in cross-correlation power distribution of the frequency shift pattern signal and erroneous detection of a synchronization position may be occurred. FIG. 8 is a diagram illustrating an example in which the synchronization signal generating unit 209 of the transmission device 200 according to the first embodiment connects a plurality of frequency shift pattern signals. FIG. 9 is a diagram illustrating a reason for which cross-correlation occurs in a case where the synchronization signal generating unit 209 of the transmission device 200 according to the first embodiment connects a plurality of frequency shift pattern signals. FIG. 8 illustrates an example in which the frequency shift pattern signals is repeated twice. FIG. 9(a) illustrates an example of a radio frame in a case where the frequency shift pattern signal is repeated twice. FIG. 9(b) illustrates a peak position of correlation power with a reference signal used for estimating a synchronization position at the reception side. FIG. 9(c) illustrates a position as which a sidelobe occurs in correlation power with a reference signal used for estimating a synchronization position at the reception side. In the example of FIG. 9(c), there is a match of 50%, which means that a high correlation power is caused.

Figure 10:
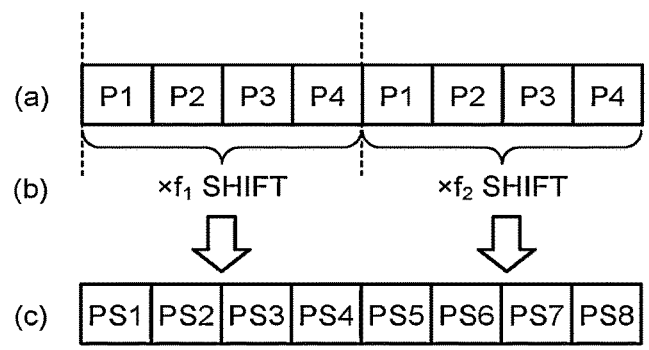
FIG. 10 is a diagram illustrating an example of second frequency shifting to reduce cross-correlation in a case where a synchronization signal generating unit of a transmission device according to the first embodiment connects a plurality of frequency shift pattern signals.

Thus, in the present embodiment, the synchronization signal generating unit 209 can generate a synchronization symbol sequence PS with reduced cross-correlation by performing second frequency shifting so that repeated frequency shift pattern signals are orthogonal to each other among frequency shift pattern signals as illustrated in FIG. 10. FIG. 10 is a diagram illustrating an example of the second frequency shifting to reduce cross-correlation in a case where the synchronization signal generating unit 209 of the transmission device 200 according to the first embodiment connects a plurality of frequency shift pattern signals. FIG. 10(a) illustrates an example in which a frequency shift pattern signal that is the second symbol sequence 404 is repeated twice. FIG. 10(b) illustrates an example of the second frequency shifting. FIG. 10(c) illustrates a synchronization symbol sequence PS generated by the second frequency shifting. As a result of the processes illustrated in FIG. 10, the synchronization signal generating unit 209 can generate a synchronization symbol sequence PS of L×REPM×NSP symbols using the number of repetitions NSP of a frequency shift pattern signal.

Figure 11:
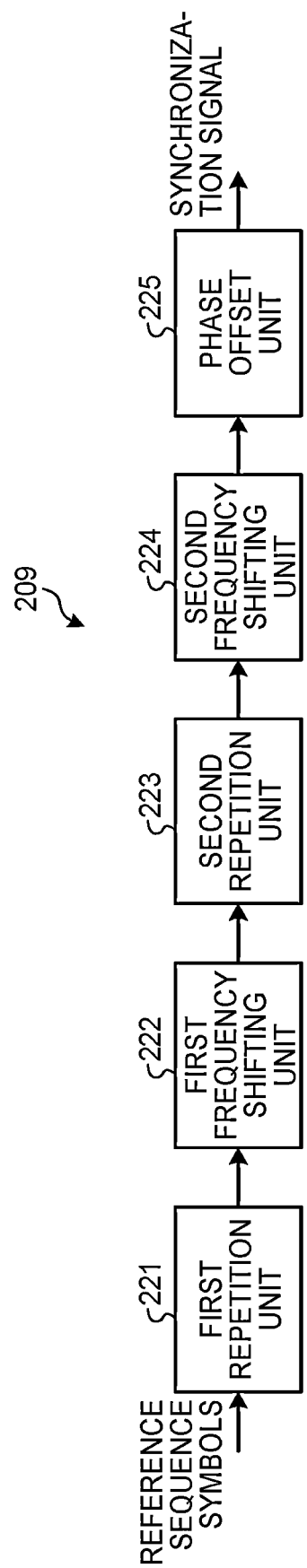
FIG. 11 is a diagram illustrating an example of a configuration of a synchronization signal generating unit of a transmission device according to the first embodiment.

In this process, the synchronization signal generating unit 209 has to select the second frequency shifting to maintain the orthogonality between frequency shift pattern signals obtained by the first frequency shifting. A configuration of the synchronization signal generating unit 209 that performs such processes will be described. FIG. 11 is a diagram illustrating an example of a configuration of the synchronization signal generating unit 209 of the transmission device 200 according to the first embodiment. The synchronization signal generating unit 209 includes a first repetition unit 221, a first frequency shifting unit 222, a second repetition unit 223, a second frequency shifting unit 224, and a phase offset unit 225.

The first repetition unit 221 connects REPM repetitions of the reference sequence symbols 401 having a sequence length L to generate a first symbol sequence 402 of L×REPM symbols. The first frequency shifting unit 222 performs, for orthogonality among users, that is, among the wireless terminals 102, the first frequency shifting in units of reference sequence symbols 401 on the first symbol sequence 402 to generate a second symbol sequence 404. The second repetition unit 223 connects NSP repetitions of the second symbol sequence 404 of L×REPM symbols to generate a frequency shift pattern signal of L×REPM×NSP symbols. The second frequency shifting unit 224 performs, for lower cross-correlation, the second frequency shifting on the frequency shift pattern signal of L×REPM×NSP symbols to generate a synchronization symbol sequence PS.

Note that, when arrangement of signal point positions of the synchronization symbol sequence PS is biased, this may cause degradation in the synchronization performance when a signal like a continuous wave (CW) with biased frequency coming from another system is mixed as interference. The phase offset unit 225 therefore adds a phase offset defined in units of symbols for the first frequency shifting to the synchronization symbol sequence PS to eliminate the signal point arrangement bias and reduce degradation in synchronization performance due to an interference wave from another system. The synchronization signal generating unit 209 uses a synchronization symbol sequence PSO obtained by the processes performed by the phase offset unit 225 as a synchronization signal 301.

Note that, in a case where the channel states are stable, such as a case where no signal coming from another system is mixed as interference and the synchronization performance is not degraded, the synchronization signal generating unit 209 may use the second symbol sequence 404 output from the first frequency shifting unit 222 as a synchronization signal or may use the synchronization symbol sequence PS output from the second frequency shifting unit 224 as a synchronization signal.

In the case of using the second symbol sequence 404 output from the first frequency shifting unit 222 as a synchronization signal, the synchronization signal generating unit 209 generates a first symbol sequence 402 constituted by two or more continuous repetitions of the reference sequence symbols 401 being a reference, and performs frequency shifting on the first symbol sequence 402 by using a phase rotation sequence so that the reference sequence symbols 401 become orthogonal for each wireless terminal 102 to generate a second symbol sequence 404. In this case, the synchronization signal generating unit 209 holds one or more sets of reference sequence symbols 401 and one or more phase rotation sequences, and generates the first symbol sequence 402 and the second symbol sequence 404 by using one of the sets of reference sequence symbols 401 and one of the phase rotation sequences for each radio frame period.

In the case of using the synchronization symbol sequence PS output from the second frequency shifting unit 224 as a synchronization signal, and the aforementioned phase rotation sequence is referred to as a first phase rotation sequence, for example, the synchronization signal generating unit 209 performs frequency shifting on the second symbol sequence 404 by using a second phase rotation sequence so that second symbol sequences 404 to be repeatedly transmitted become orthogonal to each other to generate a third symbol sequence that is the synchronization symbol sequence PS. In this case, the synchronization signal generating unit 209 holds one or more sets of reference sequence symbols 401, one or more first phase rotation sequences, and one or more second phase rotation sequences, and generates the first symbol sequence 402, the second symbol sequence 404, and the third symbol sequence by using one of the sets of reference sequence symbols 401, one of the first phase rotation sequences, and one of the second phase rotation sequences for each radio frame period.

In the case of using the synchronization symbol sequence PSO output from the phase offset unit 225 as a synchronization signal, the synchronization signal generating unit 209 performs frequency shifting on the third symbol sequence by using a third phase rotation sequence so that the signal point bias of the reference sequence symbols 401 is eliminated to generate a fourth symbol sequence that is the synchronization symbol sequence PSO. In this case, the synchronization signal generating unit 209 holds one or more sets of reference sequence symbols 401, one or more first phase rotation sequences, one or more second phase rotation sequences, and one or more third phase rotation sequences, and generates the first symbol sequence 402, the second symbol sequence 404, the third symbol sequence, and the fourth symbol sequence by using one of the sets of reference sequence symbols 401, one of the first phase rotation sequences, one of the second phase rotation sequences, and one of the third phase rotation sequences for each radio frame period.

Figure 12:
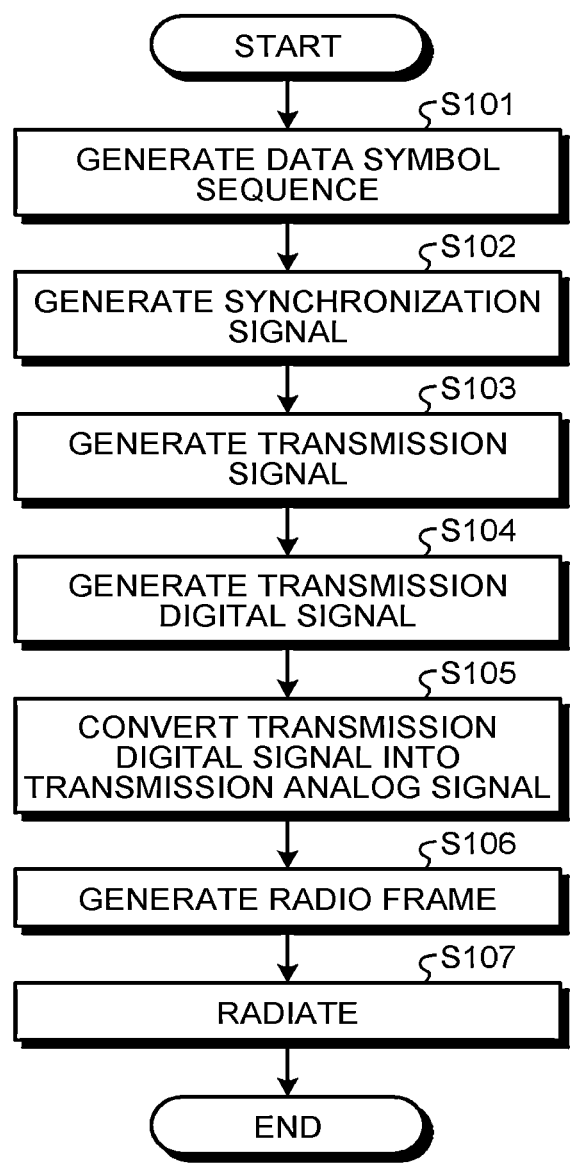
FIG. 12 is a flowchart illustrating operations of a transmission device according to the first embodiment.

The operations of the transmission device 200 will be explained with reference to a flowchart. FIG. 12 is a flowchart illustrating the operations of the transmission device 200 according to the first embodiment. In the transmission device 200, the modulation unit 202 performs first-order modulation on a data signal 201, which is a bit sequence, to generate a data symbol sequence (step S101). The synchronization signal generating unit 209 generates a synchronization signal on the basis of a pattern instruction signal 208 (step S102). The synchronization signal adding unit 203 generates a transmission signal on the basis of the synchronization signal generated by the synchronization signal generating unit 209 and the data symbol sequence generated by the modulation unit 202 (step S103). The transmission filter unit 204 upsamples the transmission signal and limits the bandwidth to generate a transmission digital signal (step S104). The digital-to-analog conversion unit 205 converts the transmission digital signal obtained from the transmission filter unit 204 into a transmission analog signal (step S105). The transmission high-frequency unit 206 performs frequency conversion on the transmission analog signal to generate a radio frame (step S106). The transmission antenna 207 radiates the radio frame in a form of a radio wave (step S107).

Figure 13:
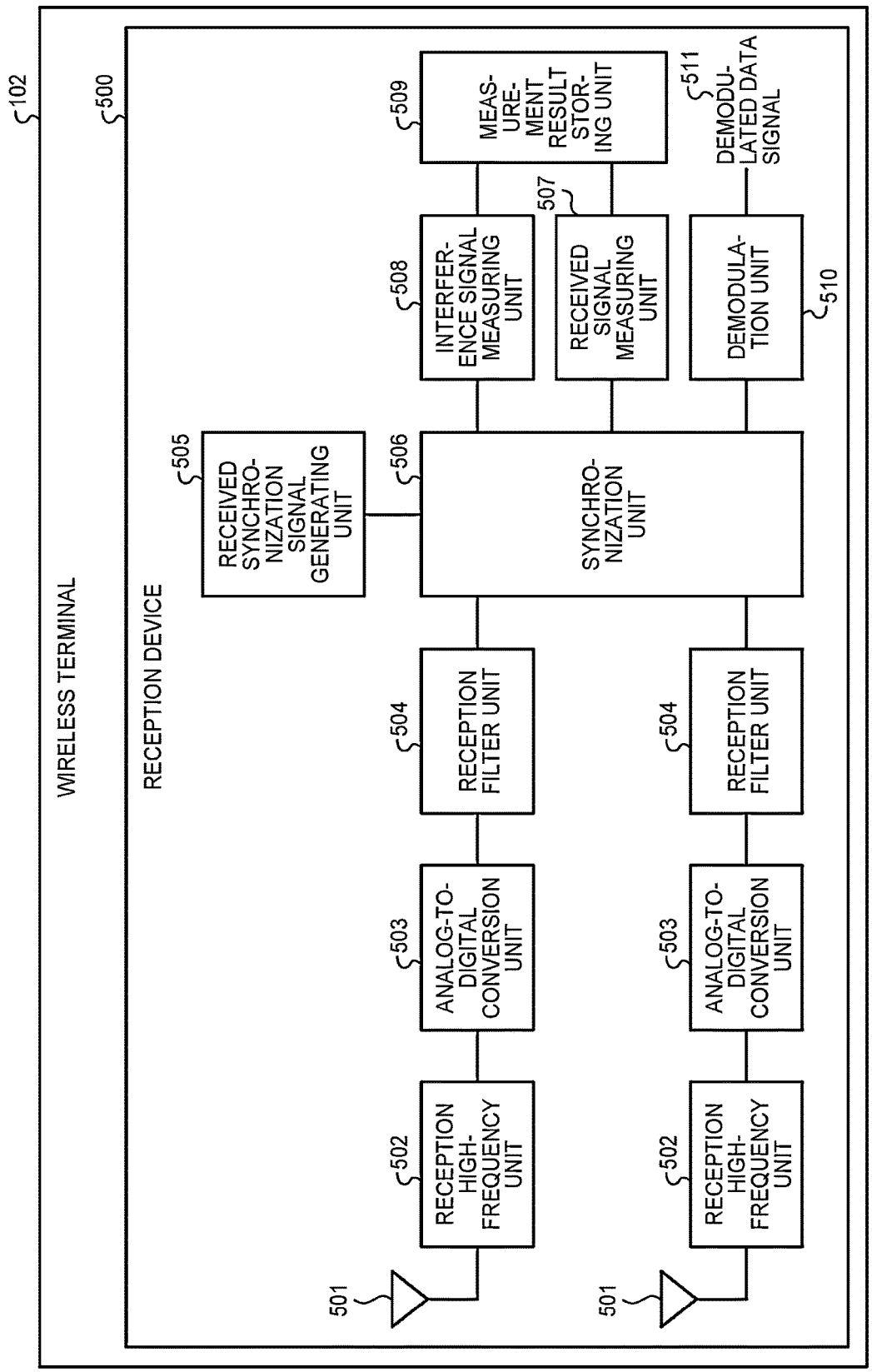
FIG. 13 is a diagram illustrating an example of a configuration of a reception device included in a wireless terminal according to the first embodiment.

Next, a reception device that is included in the wireless terminal 102 and that receives radio frames transmitted from the base station 101 will be described. FIG. 13 is a diagram illustrating an example of a configuration of a reception device 500 included in a wireless terminal 102 according to the first embodiment. The reception device 500 includes reception antennas 501, reception high-frequency units 502, analog-to-digital conversion units 503, reception filter units 504, a received synchronization signal generating unit 505, a synchronization unit 506, a received signal measuring unit 507, an interference signal measuring unit 508, a measurement result storing unit 509, and a demodulation unit 510. In the example illustrated in FIG. 13, the reception device 500 includes a plurality of sets including a reception antenna 501, a reception high-frequency unit 502, an analog-to-digital conversion unit 503, and a reception filter unit 504. Note that the reception device 500 may have a configuration including only one set including a reception antenna 501, a reception high-frequency unit 502, an analog-to-digital conversion unit 503, and a reception filter unit 504.

Each reception antenna 501 receives radio frames. The reception antenna 501 outputs a received radio frame to the reception high-frequency unit 502. Each reception high-frequency unit 502 downsamples the radio frame obtained from the reception antenna 501 to convert the radio frame into an IF signal or a baseband signal, which is an analog signal. The reception high-frequency unit 502 outputs the IF signal or baseband signal resulting from the conversion to the analog-to-digital conversion unit 503. Each analog-to-digital conversion unit 503 converts the analog signal obtained from the reception high-frequency unit 502 into a digital signal. The analog-to-digital conversion unit 503 outputs the digital signal resulting from the conversion to the reception filter unit 504. Each reception filter unit 504 limits the bandwidth of the digital signal obtained from the analog-to-digital conversion units 503 so as to remove noise out of the desired signal frequency band. The reception filter unit 504 outputs the radio frame resulting from the bandwidth limitation to the synchronization unit 506.

The received synchronization signal generating unit 505 generates a synchronization pattern signal similar to a synchronization signal generated by a synchronization signal generating unit 209 of a transmission device 200 included in a base station 101. Note that the received synchronization signal generating unit 505 generates synchronization pattern signals of a plurality of synchronization shift patterns that the synchronization signal generating unit 209 may generate. For example, in a case where the number of kinds of synchronization shift patterns of synchronization signals that the synchronization signal generating unit 209 of the transmission device 200 may generate is four, the received synchronization signal generating unit 505 generates four kinds of synchronization pattern signals. The received synchronization signal generating unit 505 has the function of generating the same signal as the synchronization signal that the synchronization signal generating unit 209 of the transmission device 200 generates, but is different in that the received synchronization signal generating unit 505 generates, as synchronization pattern signals, all synchronization signals that may be received, that is all synchronization signals that the synchronization signal generating unit 209 of the transmission device 200 may generate. The received synchronization signal generating unit 505 generates all the synchronization pattern signals in a manner similar to the method by which the synchronization signal generating unit 209 of the transmission device 200 generates the synchronization signals. The received synchronization signal generating unit 505 may generate synchronization pattern signals by storing all the synchronization pattern signals generated in advance in a memory or the like, and reading the synchronization pattern signals from the memory. The received synchronization signal generating unit 505 outputs the generated synchronization pattern signals to the synchronization unit 506.

The synchronization unit 506 performs a synchronization process, that is, a process of determination on a synchronization signal on the basis of the radio frames obtained from the respective reception filter units 504, and a plurality of synchronization pattern signals obtained from the received synchronization signal generating unit 505 to achieve synchronization of the radio frames. Specifically, the synchronization unit 506 calculates a correlation power of each of the radio frames obtained from the respective reception filter units 504 and each of the synchronization pattern signals. The synchronization unit 506 performs determination on each of the obtained correlation powers by using a first threshold, selects correlation powers that exceed the first threshold, and detects a timing at which the sum of the selected correlation powers is largest. Subsequently, the synchronization unit 506 uses a second threshold on the sum of correlation powers at the timing of maximum sum to determine whether or not the sum of correlation powers exceeds the second threshold, and determines detection of a synchronization signal included in a radio frame. Thus, the synchronization unit 506 detects a synchronization signal included in a radio frame by using the first threshold, and determines the reception timing of the detected synchronization signal by using the second threshold.

Details of the processes of detecting a synchronization signal by the synchronization unit 506 will be explained. When a radio frame is represented by $r_q(t)$, an antenna number of the reception antenna 501 that receives the radio frame is represented by q, a symbol period is represented by $T_s$, each symbol sequence constituting a synchronization pattern signal is represented by $PSO_{i,k}$, and a kind number of the synchronization pattern signal is represented by i, the synchronization unit 506 calculates a correlation power $PC_{q,i}(t)$ of the radio frame received by the reception antenna 501 with the antenna number q with reference sequence symbols P k of the synchronization pattern signal at sample time t as expressed by formula (3). Note that $1 \leq q \leq Q$ is satisfied. In addition, the synchronization unit 506 calculates a received signal power $PR_q(t)$ of the radio frame received by the reception antenna 501 with the antenna number q at sample time t as expressed by formula (4).

Formula 3

$$PC_{q,i}(t) = \sum_{k=0}^{N-1} \frac{|r_q(t+kT_s) \cdot PSO_{i,k}^*|^2}{N^2} \quad (3)$$

Formula 4

$$PR_q(t) = \sum_{k=0}^{N-1} \frac{|r_q(t+kT_s)|^2}{N^2} \quad (4)$$

As a result, the synchronization unit 506 can obtain a normalized correlation power $S_i(t)$ resulting from normalization by the received power as expressed by formula (5).

Formula 5

$$S_i(t) = \frac{\sum_{q=1}^{Q} PC_{q,i}(t)}{\sum_{q=1}^{Q} PR_q(t)} \quad (5)$$

The synchronization unit 506 determines time t at which the normalized correlation power $S_i(t)$ is largest as reception timing of a synchronization signal 301 in a radio frame. The synchronization unit 506 may further set a third threshold, and perform synchronization determination only on normalized correlation powers $S_i(t)$ larger than the third threshold.

The received signal measuring unit 507 measures reception electric field intensity for each transmission device 200 included in a base station 101 that is the transmission source of a radio frame on the basis of a synchronization signal included in the radio frame. The received signal measuring unit 507 store the measured reception electric field intensity in the measurement result storing unit 509. The measurement result storing unit 509 stores the reception electric field intensity measured by the received signal measuring unit 507.

The interference signal measuring unit 508 measures an interference signal on the basis of a signal power other than the reception electric field intensity of each transmission device 200 included in a base station 101. The interference signal measuring unit 508 reads the reception electric field intensity measured and stored by the received signal measuring unit 507 from the measurement result storing unit 509.

The demodulation unit 510 performs a demodulation process on a data symbol sequence 302 corresponding to a data signal from a symbol sequence constituting a radio frame. The demodulation unit 510 outputs a demodulated data signal 511 obtained by the demodulation process.

Figure 14:
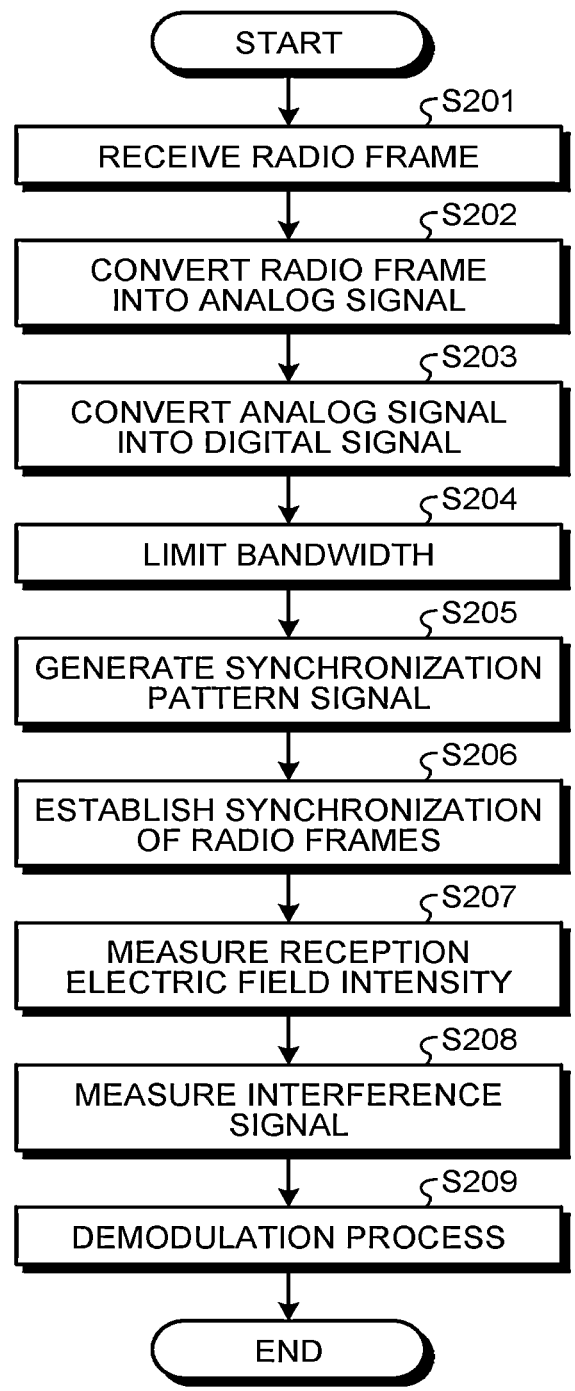
FIG. 14 is a flowchart illustrating operations of a reception device according to the first embodiment.

The operations of the reception device 500 will be explained with reference to a flowchart. FIG. 14 is a flowchart illustrating the operations of the reception device 500 according to the first embodiment. In the reception device 500, the reception antenna 501 receives a radio frame (step S201). The reception high-frequency units 502 downsamples the radio frame to convert the radio frame into an analog signal (step S202). The analog-to-digital conversion unit 503 converts the analog signal into a digital signal (step S203). The reception filter unit 504 limits the bandwidth of the digital signal (step S204). The received synchronization signal generating unit 505 generates a synchronization pattern signal similar to a synchronization signal generated by a synchronization signal generating unit 209 of a transmission device 200 (step S205). The synchronization unit 506 achieves synchronization of radio frames on the basis of a plurality of synchronization pattern signals obtained from the received synchronization signal generating unit 505 and the radio frames with the bandwidth limited by the reception filter unit 504 (step S206). The received signal measuring unit 507 measures reception electric field intensity for each transmission device 200 included in a base station 101 that is the transmission source of a radio frame on the basis of a synchronization signal (step S207). The interference signal measuring unit 508 measures an interference signal on the basis of a signal power other than the reception electric field intensity of each transmission device 200 included in a base station 101 (step S208). The demodulation unit 510 performs a demodulation process on a data symbol sequence 302 constituting a radio frame (step S209).

Next, a hardware configuration of a transmission device 200 included in a base station 101 will be described. In the transmission device 200, the transmission antenna 207 is implemented by an antenna element. The modulation unit 202, the synchronization signal generating unit 209, the synchronization signal adding unit 203, the transmission filter unit 204, the digital-to-analog conversion unit 205, and the transmission high-frequency unit 206 are implemented by processing circuitry. The processing circuitry may be constituted by a processor that executes programs stored in a memory and the memory, or may be dedicated hardware. The processing circuitry is also called a control circuit.

Figure 15:
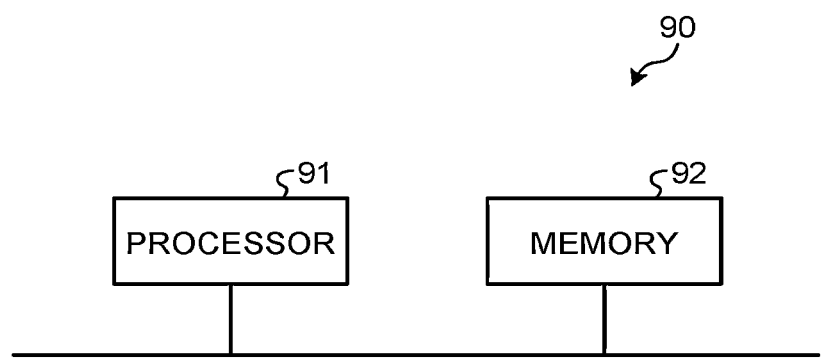
FIG. 15 is a diagram illustrating example of a configuration of processing circuitry in a case where the processing circuitry included in a transmission device according to the first embodiment is implemented by a processor and a memory.

FIG. 15 is a diagram illustrating an example of a configuration of processing circuitry 90 in a case where the processing circuitry 90 included in the transmission device 200 according to the first embodiment is implemented by a processor 91 and a memory 92. The processing circuitry 90 illustrated in FIG. 15 is a control circuit including the processor 91 and the memory 92. In the case where the processing circuitry 90 is constituted by the processor 91 and the memory 92, the functions of the processing circuitry 90 are implemented by software, firmware, or a combination of software and firmware. The software or firmware is described in the form of programs and stored in the memory 92. The processing circuitry 90 implements the functions by reading and executing the programs stored in the memory 92 by the processor 91. Specifically, the processing circuitry 90 includes the memory 92 for storing programs that results in execution of processes of the transmission device 200. The programs are, in other words, programs for causing the transmission device 200 to perform the functions implemented by the processing circuitry 90. The programs may be provided by a storage medium storing the programs, or may be provided by other means such as a communication medium.

The programs are, in other words, programs for causing the transmission device 200 to perform a first step in which the modulation unit 202 generates a data symbol sequence, a second step in which the synchronization signal generating unit 209 generates a first symbol sequence 402 constituted by two or more continuous repetitions of the reference sequence symbols 401 being a reference, and performs frequency shifting on the first symbol sequence 402 by using a phase rotation sequence so that the reference sequence symbols 401 become orthogonal for each wireless terminal 102 to generate a second symbol sequence 404, and generates a synchronization signal, and a third step in which the synchronization signal adding unit 203 adds the synchronization signal to the data symbol sequence to generate a transmission signal.

Note that the processor 91 is a central processing unit (CPU), a processing device, a computing device, a microprocessor, a microcomputer, a digital signal processor (DSP), or the like, for example. In addition, the memory 92 is a nonvolatile or volatile semiconductor memory such as a random access memory (RAM), a read only memory (ROM), a flash memory, an erasable programmable ROM (EPROM), or an electrically EPROM (EEPROM: registered trademark), a magnetic disk, a flexible disk, an optical disk, a compact disc, a mini disc, a digital versatile disc (DVD) or the like, for example.

Figure 16:
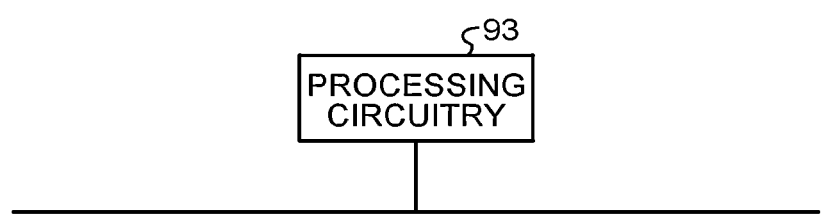
FIG. 16 is a diagram illustrating an example of processing circuitry in a case where the processing circuitry included in a transmission device according to the first embodiment is constituted by dedicated hardware.

FIG. 16 is a diagram illustrating an example of processing circuitry 93 in a case where the processing circuitry included in a transmission device 200 according to the first embodiment is constituted by dedicated hardware. The processing circuitry 93 illustrated in FIG. 16 is a single circuit, a composite circuit, a programmed processor, a parallel-programmed processor, an application specific integrated circuit (ASIC), a field programmable gate array (FPGA), or a combination thereof, for example. Part of the processing circuitry may be implemented by dedicated hardware, and part thereof may be implemented by software or firmware. As described above, the processing circuitry is capable of implementing the above-described functions by dedicated hardware, software, firmware, or a combination thereof.

While the hardware configuration of a transmission device 200 included in a base station 101 has been described, the same is applicable to the hardware configuration of a reception device 500 included in a wireless terminal 102. In the reception device 500, the reception antenna 501 is an antenna element. The measurement result storing unit 509 is a memory. The reception high-frequency unit 502, the analog-to-digital conversion unit 503, the reception filter unit 504, the received synchronization signal generating unit 505, the synchronization unit 506, the received signal measuring unit 507, the interference signal measuring unit 508, and the demodulation unit 510 are implemented by processing circuitry. In a manner similar to the case of the transmission device 200, the processing circuitry may be constituted by a processor that executes programs stored in a memory and the memory, or may be dedicated hardware.

As described above, according to the present embodiment, in the radio communication system 100, the transmission device 200 of each base station 101 generates a synchronization signal to which a frequency shift pattern signal unique to each base station 101 is assigned, and transmits a radio frame including the synchronization signal from the transmission antenna 207. The transmission device 200 has a function capable of changing the synchronization signal to be included in a radio frame for each transmission antenna 207. As a result, the reception device 500 of a wireless terminal 102 can perform the synchronization process on radio frames transmitted from the transmission devices 200 of a plurality of base stations 101, and measure the reception electric field intensity of a radio frame individually for each transmission device 200 that is a transmission source.

Note that, in the case where a transmission device 200 of a base station 101 includes a plurality of transmission antennas 207, the transmission device 200 may assign a frequency shift pattern signal unique to each transmission antenna 207, and transmit a radio frame including a synchronization signal of the assigned frequency shift pattern signal. In this case, the reception device 500 of a wireless terminal 102 can measure the reception electric field intensities of radio frames transmitted from the transmission devices 200 of a plurality of base stations 101 individually for each of a plurality of transmission antennas 207 included in a transmission device 200 that is the transmission source, and obtain the quality of reception of a radio frame transmitted from each transmission antenna 207.

The radio communication system 100 includes a plurality of communication areas 103, achieves multiplexing of wireless terminals 102, has resistance to channel variation, has noise tolerance and interference tolerance, and can therefore achieve high synchronization performance even over channels that vary at high speeds. The transmission device 200 can improve the synchronization performance in an environment in which the states of channels vary in the radio communication system 100 including a plurality of communication areas 103.

Note that the radio communication system 100 of the present embodiment is also applicable to multi-station simultaneous transmission, that is, transmission by a plurality of base stations 101 using the same information and the same frequency. In this case, in a radio frame illustrated in FIG. 3, for example, a synchronization signal 301 is further used for measurement of the reception electric field intensity of each of the base stations 101 that perform multi-station simultaneous transmission. The same is applicable to subsequent embodiments.

In addition, while the radio communication system 100 of the present embodiment is specifically described with reference to an example in which a base station 101 includes a transmission device 200, a wireless terminal 102 includes a reception device 500, and downlink communication from the base station 101 to the wireless terminal 102 is performed, the radio communication system 100 is not limited thereto. As described above, each base station 101 also includes a reception device, and each wireless terminal 102 also includes a transmission device. Thus, when a wireless terminal 102 includes a transmission device 200 and a base station 101 includes a reception device 500, for example, the present embodiment is also applicable to uplink communication from the wireless terminal 102 to the base station 101.

Second Embodiment

In a second embodiment, a method by which a reception device 500 of a wireless terminal 102 estimates an overreach signal power, which is an interference power coming from another communication area 103 will be explained.

In the second embodiment, the configurations of the radio communication system 100, the transmission device 200 included in a base station 101, and the reception device 500 included in a wireless terminal 102 are similar to those in the first embodiment. The symbols of a frequency shift pattern signal in a received signal r(t) at time t described in the first embodiment are represented by $rP_{i,k}(t)$. In this case, when an inner product value $R_{q,i}(t)$ is to be obtained in units of reference sequence symbols 401 having a sequence length L from synchronization sequence symbols PSO, the inner product value $R_{q,i}(t)$ can be expressed as in formula (6).

Formula 6:

$$R_{q,i}(t) = rP_q(t+kT_s) \cdot PSO^*_{i,k} \quad (6)$$

In formula (6), i represents a number identifying a frequency shift pattern signal, k represents the number of a symbol, q represents a reception antenna number, and * represents a complex conjugate. A vector of the inner product value $R_{q,i}(t)$ of L symbols obtained from reference sequence symbols $P_{i,k}$ of L symbols is represented by $Rv_{q,i}$. By performing fast Fourier transform (FFT) on the inner product value vector $Rv_{q,i}$, a frequency spectrum $SP_{q,i,m}(f)$ can be obtained by formula (7).

Formula 7:

$$SP_{q,i,m}(f) = FFT(Rv_{q,i}(t)) \quad (7)$$

In formula (7), m represents an identifier associated with a frequency shift amount $f_{k,m}$. In a case where $rP_q(t+kT_s)$ represents a frequency shift pattern signal corresponding to frequency shifting $f_m$, a spectral peak is present at a frequency position shifted by frequency shifting $f_m$ as in FIG. 6. FIG. 6 illustrates a case where the sequence length L of the reference sequence symbols 401 is L=4. In this case, it is desirable to use a sequence that does not have a spectral peak at another frequency as a reference sequence pattern.

When the power of an overreach interference wave is represented by IFP, and the power of an interference wave obtained by a frequency spectrum $SP_{q,i,m}(f)$ having a spectral peak at a frequency position shifted by frequency shifting $f_m$ is represented by $IFP_{q,i}(f_j)$, $IFP_{q,i}(f)$ can be expressed as in formula (8).

Formula 8

$$IFP_{q,i}(f_j) = \frac{L}{N}\left[\frac{1}{L-1}\sum_{m=1,M<\neq j}^{L}|SP_{q,i,m}(f_j)|^2\right] \quad (8)$$

Figure 17:
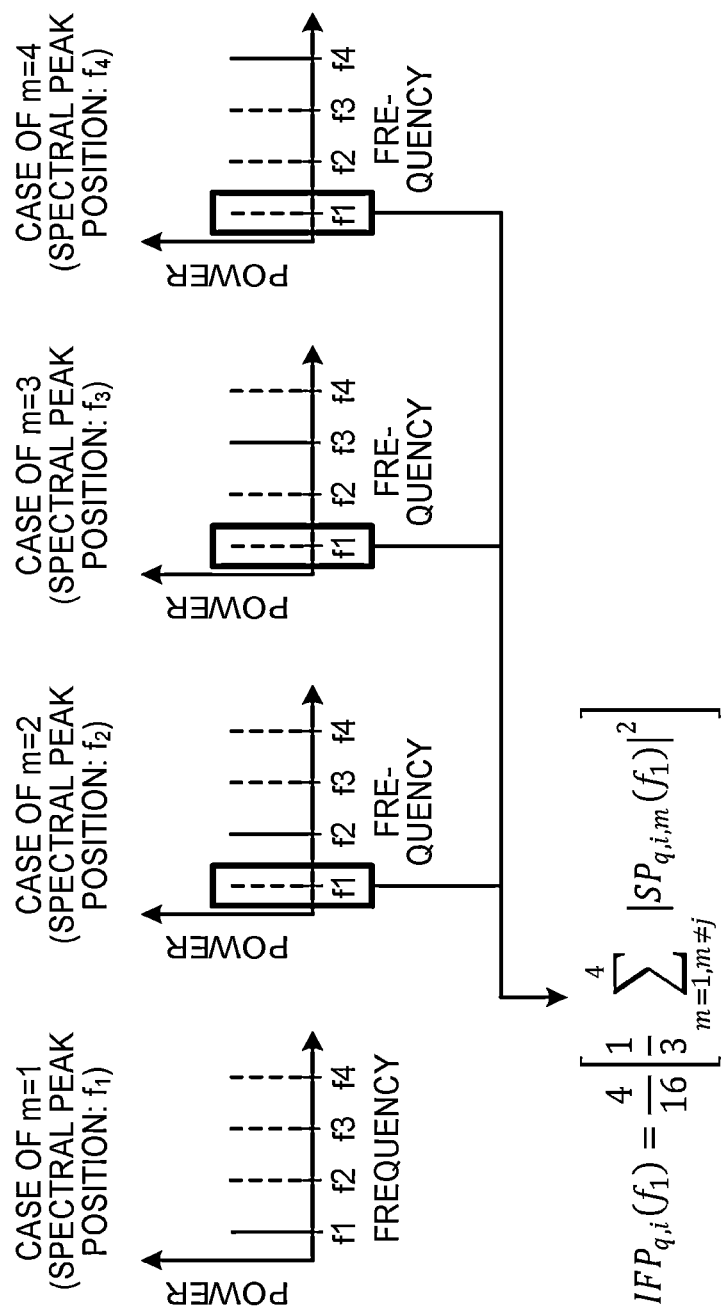
FIG. 17 is a diagram illustrating an example of a method for estimating an interference power by a reception device of a wireless terminal according to a second embodiment.

By obtaining the powers of interference waves at other frequencies $f_j$ in a similar manner by using formula (8) and obtaining an average power as expressed by formula (9), the reception device 500 of the wireless terminal 102 can obtain a coming interference power amount $IFP_i$. FIG. 17 is a diagram illustrating an example of a method for estimating an interference power by the reception device 500 of the wireless terminal 102 according to the second embodiment. FIG. 17 illustrates an example of L=4 and N=16.

Formula 9

$$IFP_i = \frac{1}{Q}\sum_{q=1}^{Q}\sum_{i=1}^{L}IFP_{q,i}(f_i) \quad (9)$$

As described above, according to the present embodiment, in the radio communication system 100, because the reception device 500 of the wireless terminal 102 estimates interference power amount in units of a short sequence length L of the reference sequence symbols 401, the phase variation due to channel variation and the influence of amplitude variation can be minimized, which has an effect of improving the accuracy of estimation of an interference power amount.

Third Embodiment

In a third embodiment, a synchronization method in a case where a synchronization symbol pattern used in the first and second embodiments as a spreading factor will be explained.

In the third embodiment, because a reference sequence length, which is a short sequence length of the reference sequence symbols 401, is repeatedly used for the spreading sequence, in addition to interference reduction among users, that is among the wireless terminals 102, as a result of achieving user multiplexing by the first frequency shifting explained in the first embodiment, a matched filter length in calculation of reception correlation can be achieved with the reference sequence length.

Assume a case where spreading and user multiplexing are performed by using a spreading factor on preset first-order modulated symbols. Examples of the modulation method of the first-order modulation include PSK, FSK, and QAM, but are not limited thereto.

Figure 18:
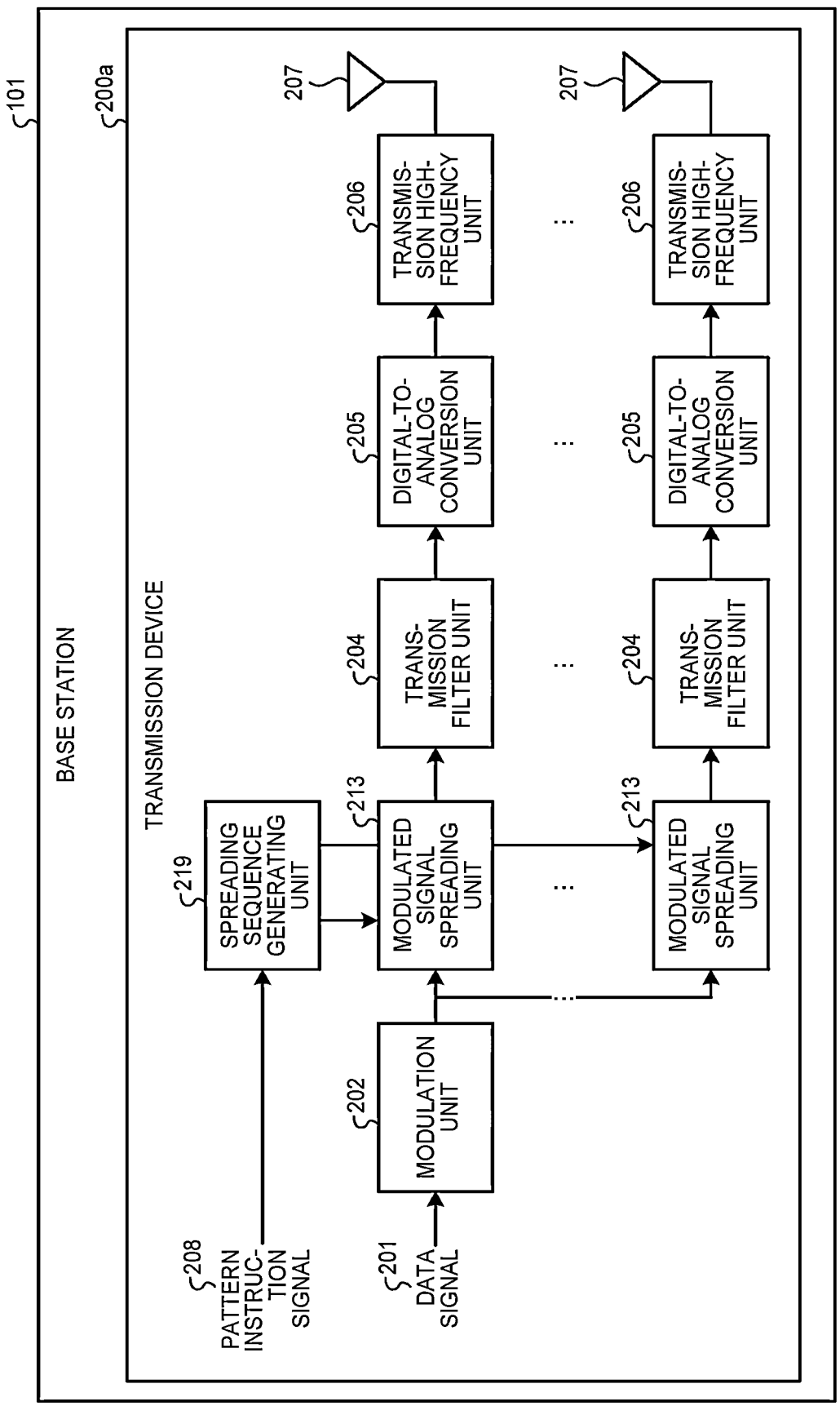
FIG. 18 is a diagram illustrating an example of a configuration of a transmission device included in a base station according to a third embodiment.

FIG. 18 is a diagram illustrating an example of a configuration of a transmission device 200a included in a base station 101 according to the third embodiment. The transmission device 200a is different from the transmission device 200 of the first embodiment illustrated in FIG. 2 in that the synchronization signal generating unit 209 and the synchronization signal adding unit 203 are removed and that a spreading sequence generating unit 219 and modulated signal spreading units 213 are added.

The spreading sequence generating unit 219 generates a spreading sequence depending on each transmission antenna 207 on the basis of a pattern instruction signal 208 input as a control parameter to the transmission device 200a. The spreading sequence generating unit 219 outputs the generated spreading sequence to the modulated signal spreading units 213.

Each modulated signal spreading unit 213 generates a transmission signal on the basis of the spreading sequence generated by the spreading sequence generating unit 219 and the data symbol sequence generated by the modulation unit 202. Specifically, the modulated signal spreading unit 213 spreads the data symbol sequence obtained from the modulation unit 202 in units of radio frames by using the spreading sequence obtained from the spreading sequence generating unit 219 to generate a transmission signal. The operations of the transmission filter units 204 and subsequent components are similar to those in the first embodiment.

Note that the spreading sequence generated by the spreading sequence generating unit 219 can be implemented by the same structure as a synchronization signal generated by the synchronization signal generating unit 209 described in the first embodiment.

Figure 19:
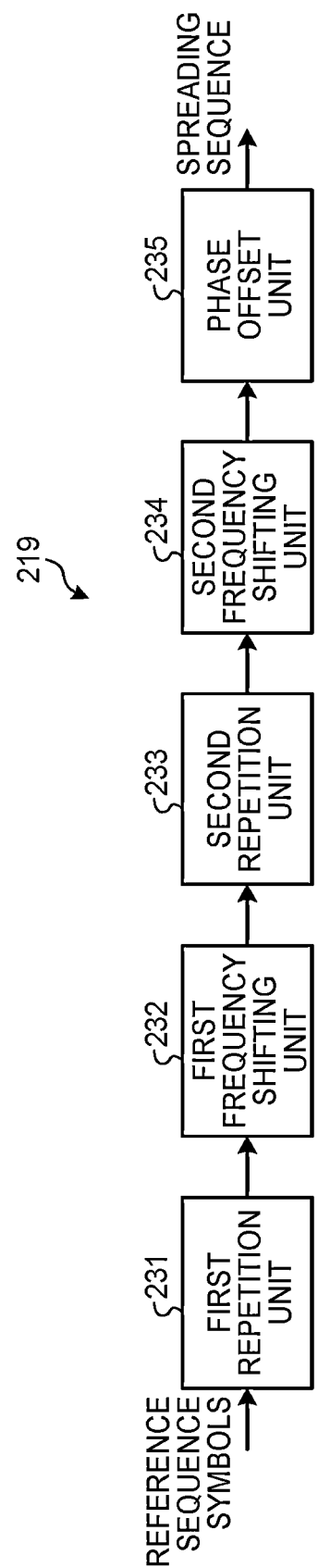
FIG. 19 is a diagram illustrating an example of a configuration of a spreading sequence generating unit of a transmission device according to the third embodiment.

FIG. 19 is a diagram illustrating an example of a configuration of the spreading sequence generating unit 219 of the transmission device 200a according to the third embodiment. The spreading sequence generating unit 219 includes a first repetition unit 231, a first frequency shifting unit 232, a second repetition unit 233, a second frequency shifting unit 234, and a phase offset unit 235.

The first repetition unit 231 connects REPM repetitions of the reference sequence symbols 401 having a sequence length L to generate a first symbol sequence of L×REPM symbols. The first frequency shifting unit 232 performs, for orthogonality among users, that is, among the wireless terminal 102, the first frequency shifting in units of reference sequence symbols 401 on the first symbol sequence to generate a second symbol sequence. The second repetition unit 233 connects NSP repetitions of the second symbol sequence of L×REPM symbols to generate a frequency shift pattern signal of L×REPM×NSP symbols. The second frequency shifting unit 234 performs, for lower cross-correlation, the second frequency shifting on the frequency shift pattern signal of L×REPM×NSP symbols to generate a synchronization symbol sequence. The phase offset unit 235 adds a phase offset defined in units of symbols for the first frequency shifting to the synchronization symbol sequence to eliminate the signal point arrangement bias and reduce degradation in synchronization performance due to an interference wave from another system. The spreading sequence generating unit 219 uses the synchronization symbol sequence obtained by the processes performed by the phase offset unit 235 as a spreading sequence.

Note that the spreading sequence generating unit 219 can use, as the spreading sequence, a sequence output from the first frequency shifting unit 232, a sequence output from the second repetition unit 233, or a sequence output from the second frequency shifting unit 234. In any of these cases, the spreading sequence generating unit 219 sets the number of symbols of the sequence to be used as the spreading sequence to L×REPM×NSP symbols. As a result, the modulated signal spreading unit 213 spreads one symbol to a maximum of L×REPM×NSP chips. As described above, in the third embodiment, the reference sequence symbols 401 used by a transmission device 200 included in a base station 101 of the first and second embodiments are used as a spreading sequence.

Figure 20:
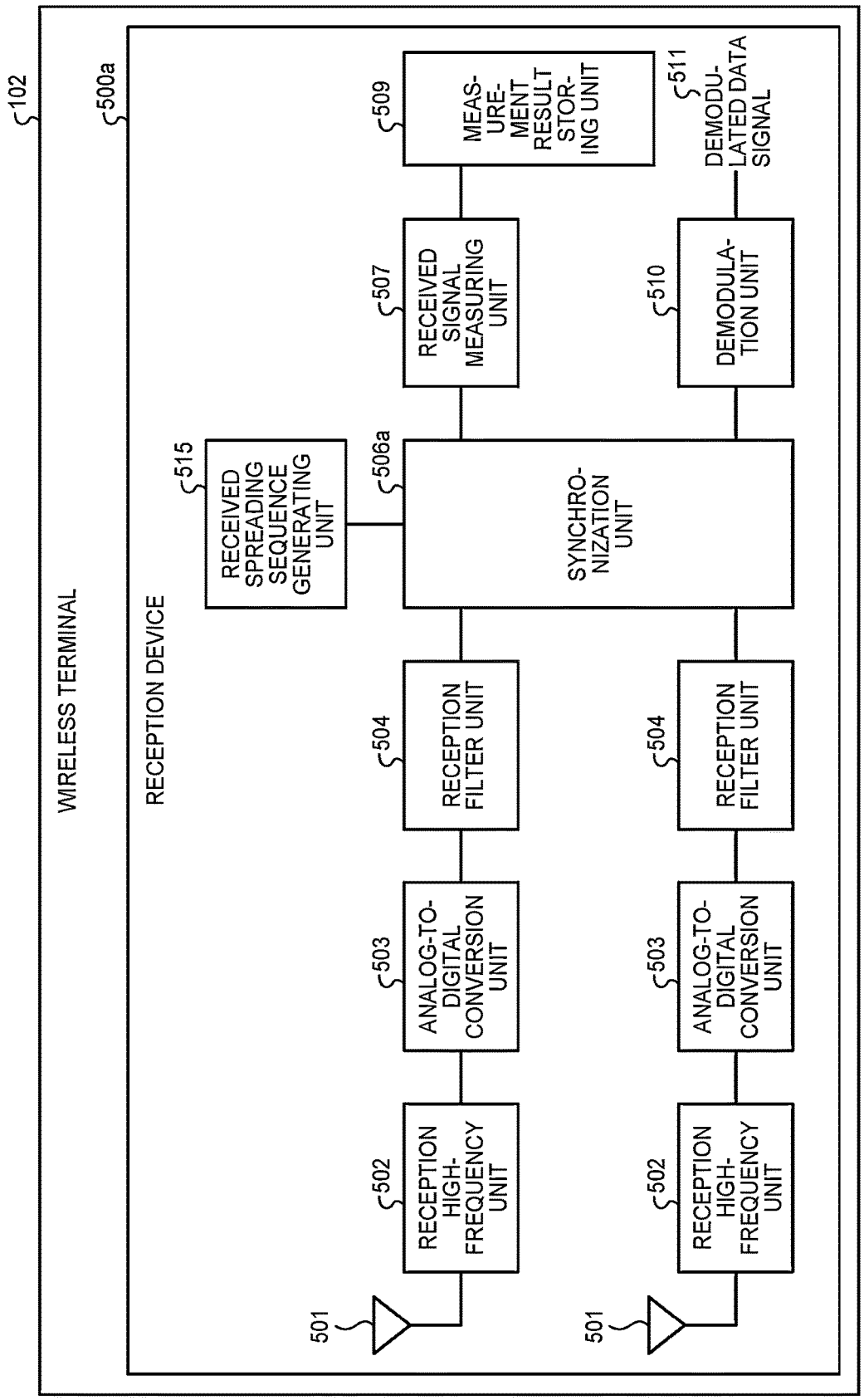
FIG. 20 is a diagram illustrating an example of a configuration of a reception device included in a wireless terminal according to the third embodiment.

Next, a reception device that is included in the wireless terminal 102 and that receives radio frames transmitted from the base station 101 will be described. FIG. 20 is a diagram illustrating an example of a configuration of a reception device 500a included in a wireless terminal 102 according to the third embodiment. The reception device 500a is different from the reception device 500 of the first embodiment illustrated in FIG. 13 in that the received synchronization signal generating unit 505, the synchronization unit 506, and the interference signal measuring unit 508 are removed and that a received spreading sequence generating unit 515 and a synchronization unit 506a are added.

The received spreading sequence generating unit 515 generates a spreading sequence similar to the spreading sequence generated by the transmission device 200. The received spreading sequence generating unit 515 outputs the generated spreading sequence to the synchronization unit 506a.

The synchronization unit 506a performs a synchronization process, that is, a process of determination on a synchronization signal on the basis of received frames obtained from the respective reception filter units 504 and the spreading sequence obtained from the received spreading sequence generating unit 515 to establish synchronization of radio frames.

Figure 21:
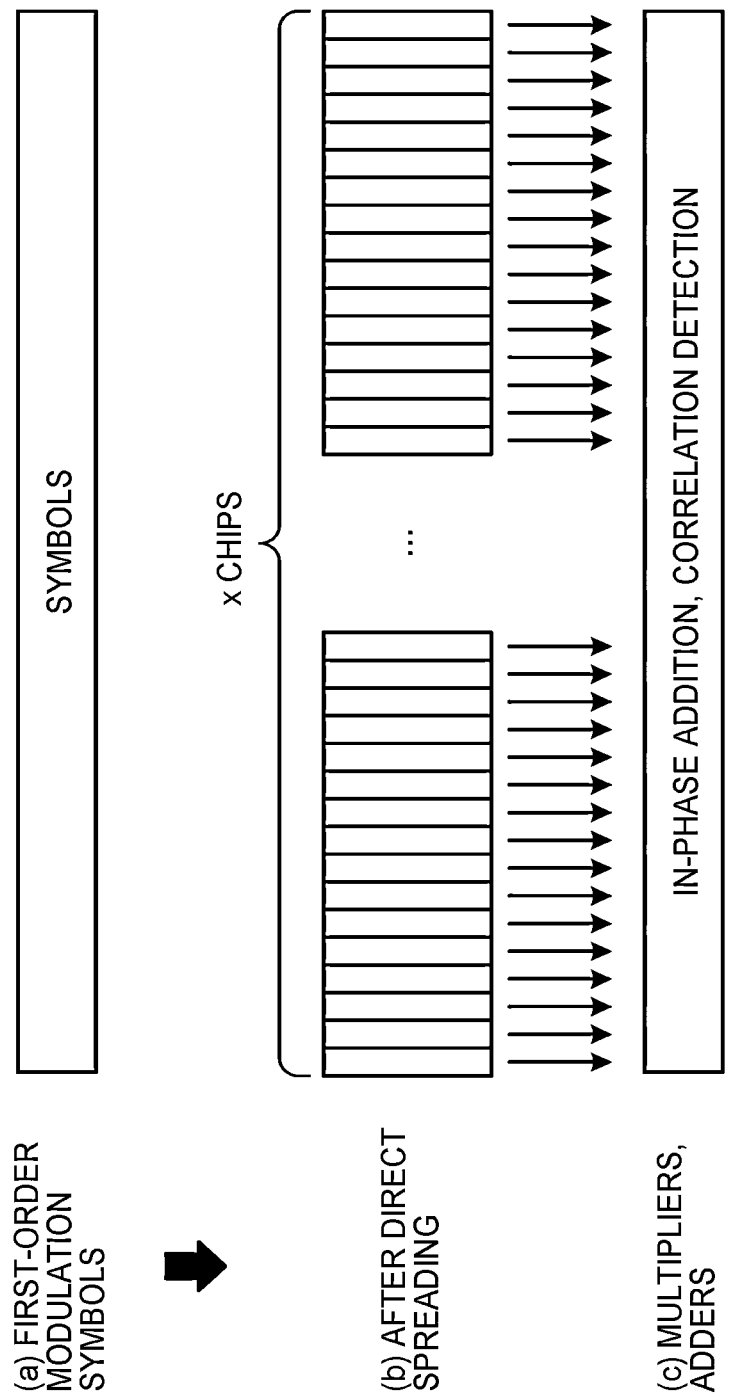
FIG. 21 is a diagram illustrating an example of a synchronization process performed by a reception device included in a wireless terminal in a case of using a spreading sequence in a comparative example.
Figure 22:
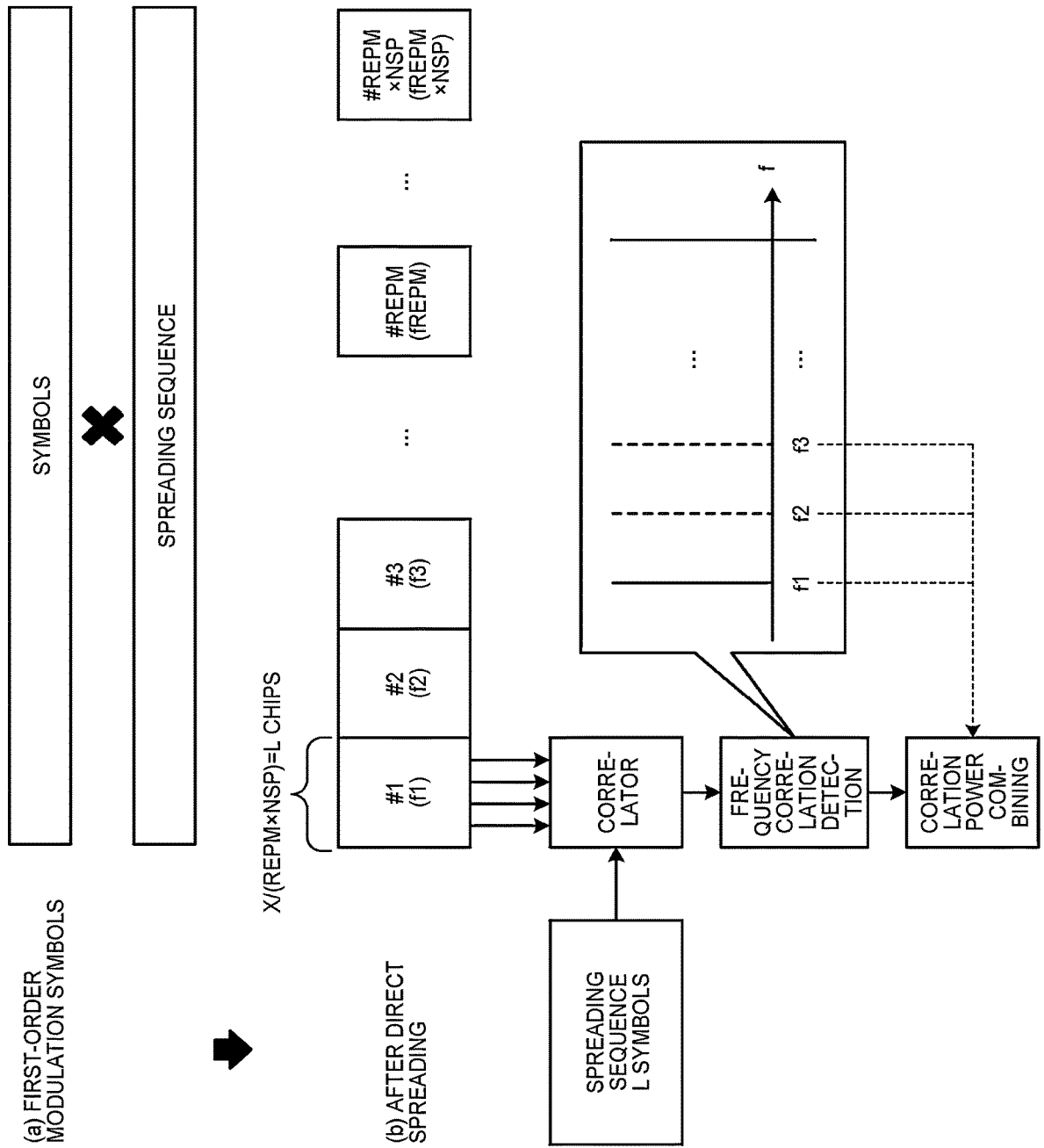
FIG. 22 is a diagram illustrating an example of a synchronization process performed by a reception device included in a wireless terminal according to the third embodiment.

FIG. 21 is a diagram illustrating an example of a synchronization process performed by a reception device included in a wireless terminal in a case of using a spreading sequence as a comparative example. FIG. 22 is a diagram illustrating an example of a synchronization process performed by the reception device 500a included in a wireless terminal 102 according to the third embodiment. In a case where direct spreading is performed on a data symbol sequence of first-order modulated symbols illustrated in FIG. 21(a), multipliers and adders whose numbers correspond to the number X of chips after direct spreading are necessary for in-phase addition and correlation detection as illustrated in FIGS. 21(b) and 21(c). Thus, the circuit size becomes large in order to achieve a very large spreading factor, which may not be realistic.

In contrast, in the present embodiment, even when the number of chips is large, a small circuit size can be achieved. FIG. 22 illustrates a concept of the synchronization process performed by the synchronization unit 506a in the present embodiment. A radio frame that is a received signal to be processed by the synchronization unit 506a is represented by rc(t). The synchronization unit 506a obtains an inner product of chips of a radio frame rc(t) and reference sequence symbols a(t) of a sequence length L, and obtains a spectrum of a frequency spectrum P(f,k,j) as expressed by formula (10).

Formula 10

$$P(f, k, j) =$$
$$FFT[rc(t, k) \cdot a(t)] = \frac{1}{\sqrt{L}} \sum_{t=1}^{L} \{rc\{t + (k-1)L + j\} \cdot a^*(t)\} e^{-2\pi f t/L} \quad (10)$$

In formula (10), k represents an integer satisfying REPM× NSP≥k≥1, and j represents an identifier indicating a chip position of a radio frame. In this process, in a case where the spreading sequence used by the transmission device 200a that is the transmission source of the radio frame is a spreading sequence with its spectral peak position shifted to f1 by a first frequency spectrum, a second frequency spectrum, and the phase offset process, the maximum value of the spectral powers should appear at the point f1. The synchronization unit 506a performs calculation of a spectral power REPM×NSP times to obtain a sum $P_{sum}(j)$ of the spectral powers as expressed by formula (11).

Formula 11

$$P_{sum}(j) = \sum_{k=1}^{REPM \times NSP} |P(f_i, k, j)|^2 \quad (11)$$

In formula (11), i represents an identifier indicating the frequency position at which a power peak of a frequency spectrum appears. The synchronization unit 506a repeats, REPM×NSP times which corresponds to the spreading sequence length, the process of shifting by one chip and obtaining the sum of spectral powers. Thereafter, the synchronization unit 506a changes the value of j, similarly obtains a sum of spectral powers, and determines, as a synchronization position, a point j at which the maximum power of a spectral peak is obtained.

The synchronization unit 506a calculates a correlation power with each of frequency pattern signals, performs determination on each of the obtained correlation powers by using a first threshold, selects only correlation powers that exceed the first threshold, and detects a timing at which the sum of the selected correlation powers is largest. Subsequently, the synchronization unit 506a determines detection of a synchronization signal by determining whether or not the sum of correlation powers exceeds a second threshold by using the second threshold on the sum of correlation powers at the timing of maximum sum. The synchronization unit 506a can determine a point J obtained by such detection determination as a start position of a spreading sequence.

While multipliers and adders whose numbers correspond to the number X of chips after direct spreading are necessary in the method of the comparative example, the sequence length L is sufficient for the matched filter length necessary at reception in the present embodiment because the spreading sequence is constituted by repetitions of reference sequence symbols a(t) having a short sequence length L. Thus, in a case where the spreading rate is sufficiently high, the reception device 500a can sufficiently reduce the reception circuit size, and can achieve a very large number of spreading sequences that cannot be achieved by a matched filter type of the related art.

As described above, according to the present embodiment, in the radio communication system 100, the transmission device 200a of the base station 101 and the reception device 500a of the wireless terminal 102 use the synchronization symbol pattern used in the first and second embodiments as a spreading factor. In this case as well, the radio communication system 100 can produce the same effects as those in the first and second embodiments. In addition, in the radio communication system 100, the reception device 500a of the wireless terminal 102 can prevent the circuit size from increasing.

While the radio communication system 100 of the present embodiment is specifically described with reference to an example in which a base station 101 includes a transmission device 200a, a wireless terminal 102 includes a reception device 500a, and downlink communication from the base station 101 to the wireless terminal 102 is performed, the radio communication system 100 is not limited thereto. As described above, each base station 101 also includes a reception device, and each wireless terminal 102 also includes a transmission device. Thus, when a wireless terminal 102 includes a transmission device 200a and a base station 101 includes a reception device 500a, for example, the present embodiment is also applicable to uplink communication from the wireless terminal 102 to the base station 101.

A transmission device according to the present disclosure produces an effect of enabling improvement in synchronization performance in an environment in which the states of channels vary in a radio communication system including a plurality of communication areas.

The configurations presented in the embodiments above are examples, and can be combined with other known technologies or with each other, or can be partly omitted or modified without departing from the gist.

What is claimed is:

1. A transmission device included in one base station in a radio communication system including communication areas adjacent to each other in which the base station communicates with a plurality of wireless terminals, the transmission device comprising:
    modulation circuitry to generate a data symbol sequence;
    synchronization signal generating circuitry to generate a first symbol sequence constituted by two or more continuous repetitions of reference sequence symbols being a reference, generate a second symbol sequence by performing frequency shifting on the first symbol sequence by using a phase rotation sequence so that the reference sequence symbols become orthogonal for each of the wireless terminals, and generate a synchronization signal; and
    synchronization signal adding circuitry to generate a transmission signal by adding the synchronization signal to the data symbol sequence,
    wherein the phase rotation sequence is a first phase rotation sequence, and
    the synchronization signal generating circuitry performs frequency shifting on the second symbol sequence by using a second phase rotation sequence so that second symbol sequences to be repeatedly transmitted become orthogonal to each other to generate a third symbol sequence, and generate the synchronization signal.

2. The transmission device according to claim 1, wherein the synchronization signal generating circuitry holds one or more sets of reference sequence symbols, one or more first phase rotation sequences, and one or more second phase rotation sequences, and generates the first symbol sequence, the second symbol sequence, and the third symbol sequence by using one of the sets of reference sequence symbols, one of the first phase rotation sequences, and one of the second phase rotation sequences for each radio frame period.

3. The transmission device according to claim 1, wherein the synchronization signal generating circuitry performs frequency shifting on the third symbol sequence by using a third phase rotation sequence so that signal point bias of the reference sequence symbols is eliminated to generate a fourth symbol sequence, and generate the synchronization signal.

4. The transmission device according to claim 3, wherein the synchronization signal generating circuitry holds one or more sets of reference sequence symbols, one or more first phase rotation sequences, one or more second phase rotation sequences, and one or more third phase rotation sequences, and generates the first symbol sequence, the second symbol sequence, the third symbol sequence, and the fourth symbol sequence by using one of the sets of reference sequence symbols, one of the first phase rotation sequences, one of the second phase rotation sequences, and one of the third phase rotation sequences for each radio frame period.

5. A transmission device that uses reference sequence symbols used by the transmission device according to claim 1 as a spreading sequence.

6. A transmission device that uses reference sequence symbols used by the transmission device according to claim 2 as a spreading sequence.

7. A transmission device that uses reference sequence symbols used by the transmission device according to claim 3 as a spreading sequence.

8. A transmission device that uses reference sequence symbols used by the transmission device according to claim 4 as a spreading sequence.

9. A reception device that receives a radio frame transmitted from the transmission device according to claim 5, the reception device comprising:
received spreading sequence generating circuitry to generate a spreading sequence similar to a spreading sequence generated by the transmission device; and
synchronization circuitry to establish radio frame synchronization on the basis of the radio frame and the spreading sequence generated by the received spreading sequence generating circuitry.

10. A reception device that receives a radio frame transmitted from the transmission device according to claim 6, the reception device comprising:
received spreading sequence generating circuitry to generate a spreading sequence similar to a spreading sequence generated by the transmission device; and
synchronization circuitry to establish radio frame synchronization on the basis of the radio frame and the spreading sequence generated by the received spreading sequence generating circuitry.

11. A reception device that receives a radio frame transmitted from the transmission device according to claim 7, the reception device comprising:
received spreading sequence generating circuitry to generate a spreading sequence similar to a spreading sequence generated by the transmission device; and
synchronization circuitry to establish radio frame synchronization on the basis of the radio frame and the spreading sequence generated by the received spreading sequence generating circuitry.

12. A reception device that receives a radio frame transmitted from the transmission device according to claim 8, the reception device comprising:
received spreading sequence generating circuitry to generate a spreading sequence similar to a spreading sequence generated by the transmission device; and
synchronization circuitry to establish radio frame synchronization on the basis of the radio frame and the spreading sequence generated by the received spreading sequence generating circuitry.

13. A base station comprising the transmission device according to claim 5.

14. A base station comprising the transmission device according to claim 6.

15. A base station comprising the transmission device according to claim 7.

16. A base station comprising the transmission device according to claim 8.

* * * * *